(12) United States Patent
Inagaki

(10) Patent No.: US 10,021,289 B2
(45) Date of Patent: Jul. 10, 2018

(54) IMAGE PICKUP APPARATUS AND IMAGE PICKUP SYSTEM WITH POINT IMAGE INTENSITY DISTRIBUTION CALCULATION

(71) Applicant: CANON KABUSHIKI KAISHA, Tokyo (JP)

(72) Inventor: Yu Inagaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/969,630

(22) Filed: Dec. 15, 2015

(65) Prior Publication Data

US 2016/0191787 A1 Jun. 30, 2016

(30) Foreign Application Priority Data

Dec. 26, 2014 (JP) ................................ 2014-266496

(51) Int. Cl.
H04N 5/232 (2006.01)
H04N 5/369 (2011.01)

(52) U.S. Cl.
CPC ....... H04N 5/23212 (2013.01); H04N 5/3696 (2013.01)

(58) Field of Classification Search
CPC . H04N 5/23212; H04N 5/3696; H04N 5/2254
See application file for complete search history.

(56) References Cited

U.S. PATENT DOCUMENTS

| | | | | |
|---|---|---|---|---|
| 7,723,662 B2 * | 5/2010 | Levoy | ................. | G02B 21/361 250/208.1 |
| 8,358,354 B2 * | 1/2013 | Ng | .................... | H04N 5/3572 348/222.1 |
| 8,446,516 B2 * | 5/2013 | Pitts | ................... | H04N 5/23212 348/345 |
| 8,698,944 B2 * | 4/2014 | Ng | ...................... | G02B 3/0056 348/349 |
| 2008/0266655 A1 * | 10/2008 | Levoy | ................. | G02B 21/361 359/368 |
| 2013/0335618 A1 * | 12/2013 | Sugawara | .......... | H04N 5/23212 348/349 |
| 2013/0342732 A1 | 12/2013 | Yokoyama | | |

FOREIGN PATENT DOCUMENTS

| | | |
|---|---|---|
| JP | 2007-121896 A | 5/2007 |
| JP | 2013-171251 A | 9/2013 |
| JP | 2014-7493 A | 1/2014 |

* cited by examiner

*Primary Examiner* — Nicholas G Giles
(74) *Attorney, Agent, or Firm* — Fitzpatrick, Cella, Harper & Scinto

(57) ABSTRACT

An image pickup apparatus, comprising a point image intensity distribution generating unit configured to generate a point image intensity distribution based on lens light field data and a sensor light-receiving intensity characteristic, the lens light field data including information relating to directions of a plurality of light fluxes emitted from one point of an object position and passing through different regions of an exit pupil of an imaging optical system; and information relating to positions of points on the plurality of light fluxes, the sensor light-receiving intensity characteristic representing light-receiving intensities, which are determined on a light receiving surface of an image pickup element, of light fluxes passing through respective regions of an entrance pupil of a microlens arranged over the image pickup element.

25 Claims, 24 Drawing Sheets

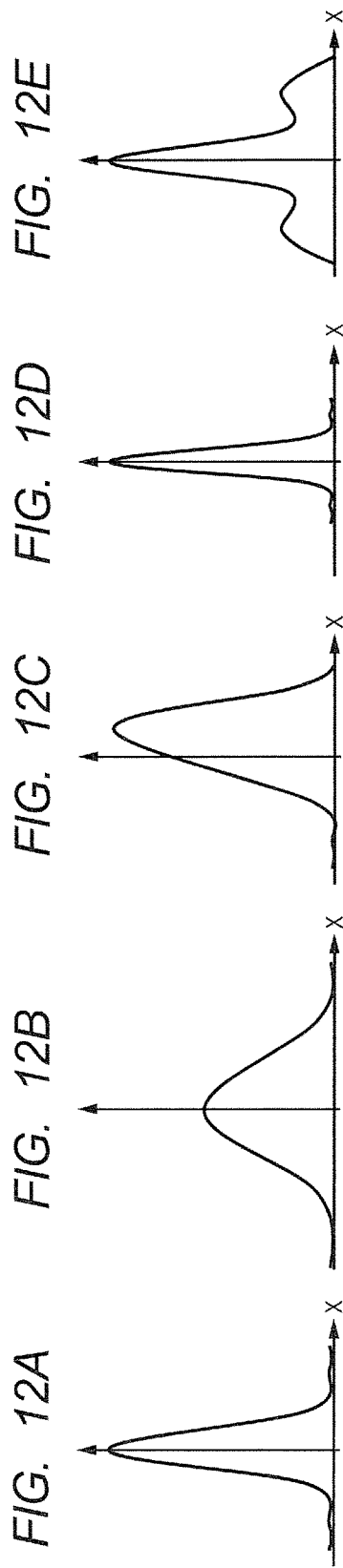

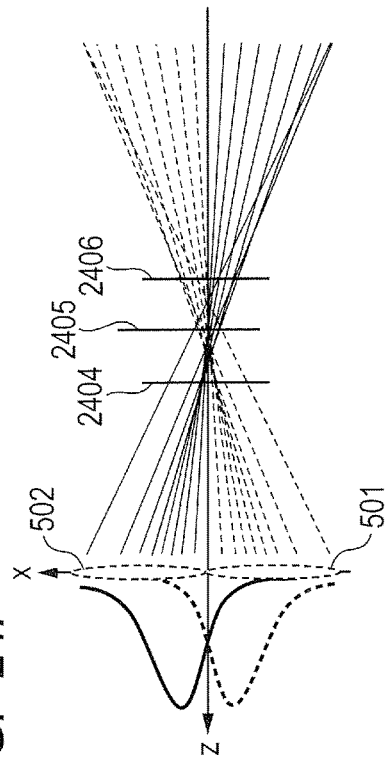
FIG. 24A
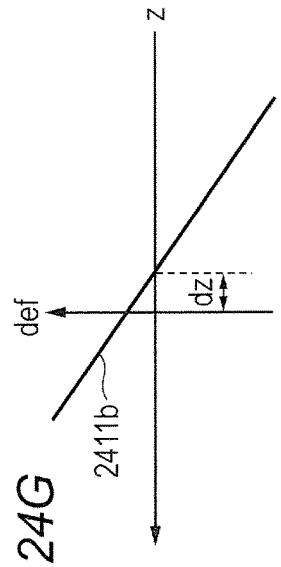
FIG. 24B
FIG. 24C  FIG. 24D  FIG. 24E
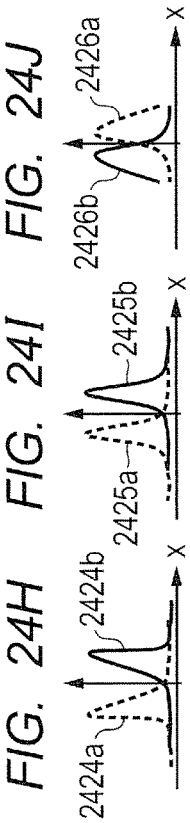
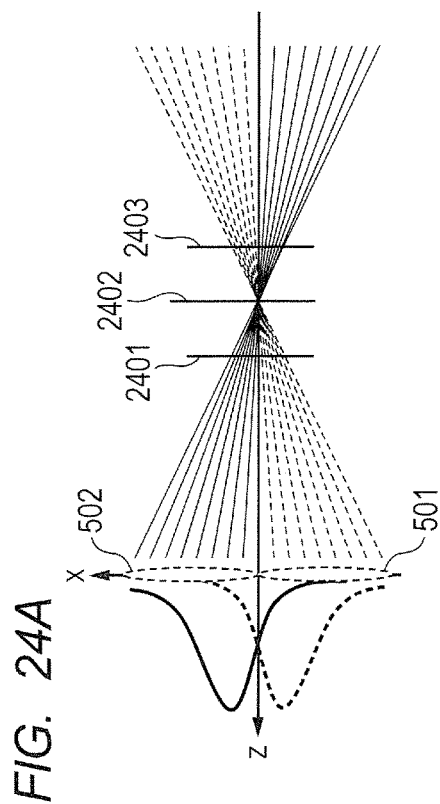
FIG. 24F
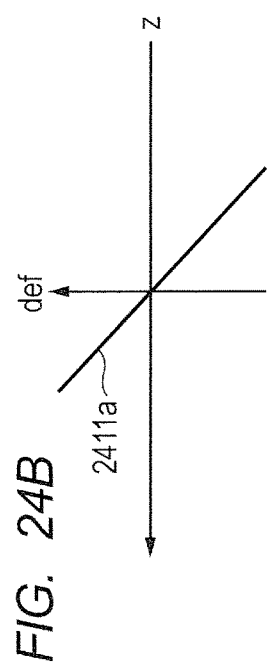
FIG. 24G
FIG. 24H  FIG. 24I  FIG. 24J
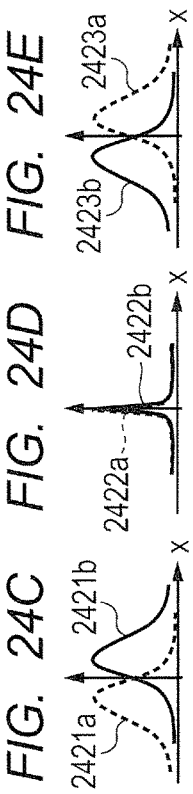

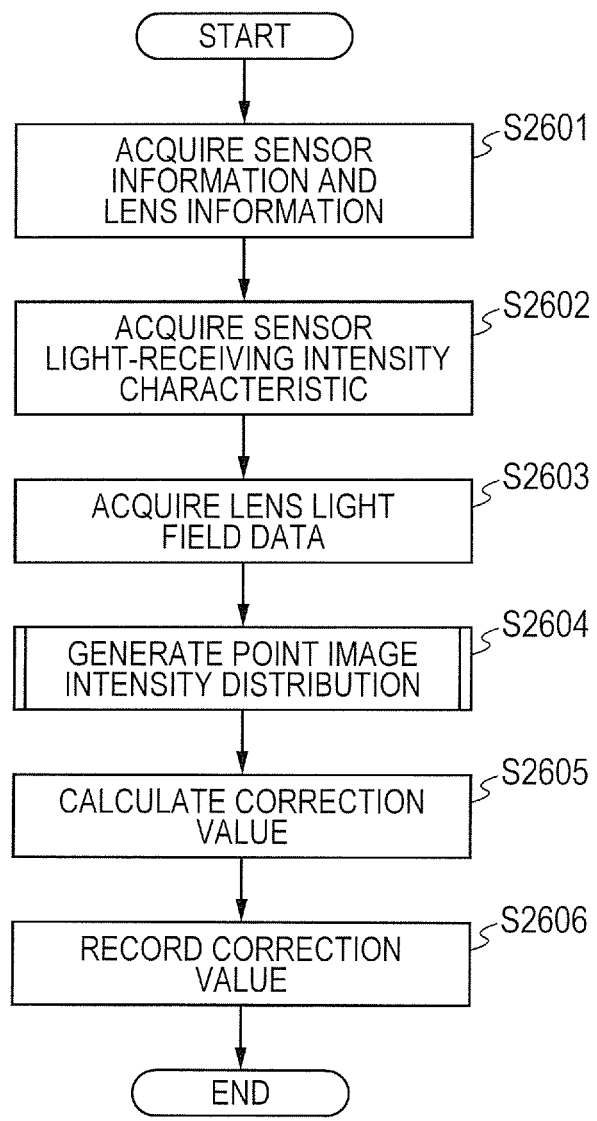

IMAGE PICKUP APPARATUS AND IMAGE PICKUP SYSTEM WITH POINT IMAGE INTENSITY DISTRIBUTION CALCULATION

BACKGROUND OF THE INVENTION

Field of the Invention

The present invention relates to an image pickup apparatus and an image pickup system.

Description of the Related Art

There have been proposed a focus detection apparatus and an optical system that are configured to perform focus detection correction based on information representing a light-flux distribution and information on an aperture of an imaging optical system.

In Japanese Patent Application Laid-Open No. 2007-121896, it is disclosed that a conversion coefficient for converting a shift amount of a pair of images into a defocus amount of an imaging optical system is calculated based on information representing a light-flux distribution and information on an aperture of the imaging optical system.

Further, there have been proposed an image pickup apparatus and an image pickup system that are configured to perform focus detection correction and image processing based on a point image intensity distribution calculated in advance.

In Japanese Patent Application Laid-Open No. 2013-171251, it is disclosed that a predetermined offset amount is acquired. The predetermined offset amount is determined based on a difference in shape of a pair of images generated by a pair of light fluxes passing through an exit pupil, which is caused by aberration of a photographing optical system.

In Japanese Patent Application Laid-Open No. 2014-7493, it is described that whether or not to perform image restoration processing on an input image is determined based on a photographing state. In Japanese Patent Application Laid-Open No. 2014-7493, an image restoration filter is acquired, and the image restoration processing is performed on the input image, only when determination to perform the image restoration processing is made.

SUMMARY OF THE INVENTION

According to one aspect of an embodiment, an image pickup apparatus, includes a point image intensity distribution generating unit configured to generate a image intensity distribution based on lens light field data and a sensor light-receiving intensity characteristic, the lens light field data including information relating to directions of a plurality of light fluxes emitted from one point of an object position and passing through different regions of an exit pupil of an imaging optical system; and information relating to positions of points on the plurality of light fluxes, the sensor light-receiving intensity characteristic representing light-receiving intensities, which are determined on a light receiving surface of an image pickup element, of light fluxes passing through respective regions of an entrance pupil of a microlens arranged over the image pickup element.

According to another aspect of the embodiment, an image pickup system, includes a lens light field data storage unit configured to store lens light field data including information relating to directions of a plurality of light fluxes emitted from one point of an object position and passing through different regions of an exit pupil of an imaging optical system, and information relating to positions of points on the plurality of light fluxes; a sensor light-receiving intensity characteristic storage unit configured to store a sensor light-receiving intensity characteristic representing light-receiving intensities, which are determined on a light receiving surface of an image pickup element, of light fluxes passing through respective regions of an entrance pupil of a microlens arranged over the image pickup element; and a point image intensity distribution generating unit configured to generate a point image intensity distribution based on the lens light field data and the sensor light-receiving intensity characteristic.

Further features of the present invention will become apparent from the following description of exemplary embodiments with reference to the attached drawings.

BRIEF DESCRIPTION OF THE DRAWINGS

FIG. 12A, FIG. 12B, FIG. 12C, FIG. 12D, and FIG. 12E are diagrams for illustrating point image intensity distributions.

FIG. 24A, FIG. 24B, FIG. 24C, FIG. 24D, FIG. 24E, FIG. 24F, FIG. 24G, FIG. 24H, FIG. 24I, and FIG. 24J are schematic diagrams for illustrating a defocus offset generation principle.

FIG. 26 is a flow chart for illustrating a schematic operation of the image pickup system according to the second embodiment of the present invention.

DESCRIPTION OF THE EMBODIMENTS

A photographing lens and an image pickup apparatus main body have manufacturing variations and the like. It is not easy to generate a highly-accurate point image intensity distribution taking such manufacturing variations and the like into consideration.

Now, embodiments of the present invention are described in detail with reference to the drawings.

First Embodiment

An image pickup apparatus according to a first embodiment of the present invention is described with reference to the drawings.

[Configuration of Image Pickup Apparatus]

Figure 1:
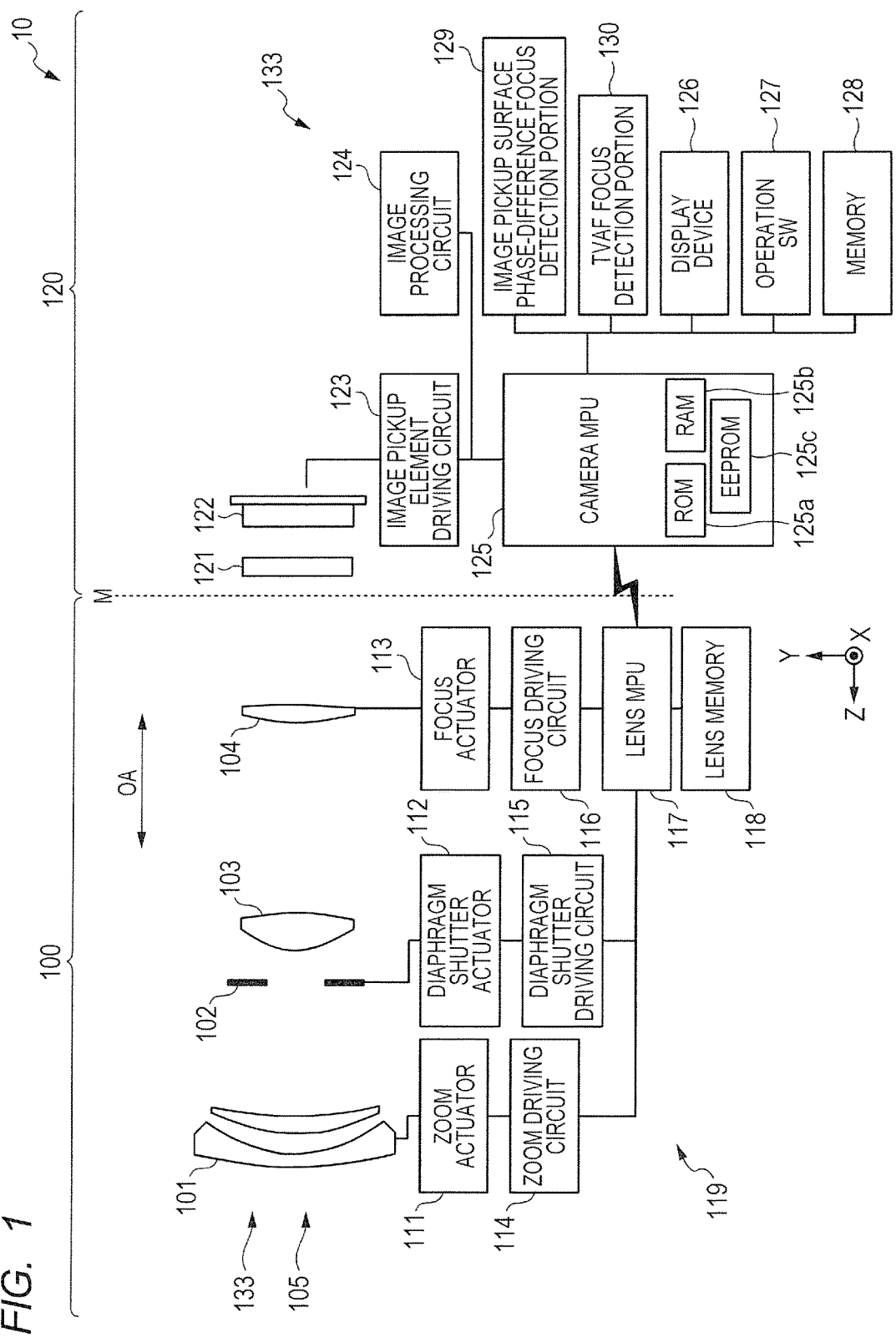
FIG. 1 is a block diagram for illustrating a schematic configuration of an image pickup apparatus according to a first embodiment of the present invention.

First, the configuration of the image pickup apparatus according to this embodiment is described. FIG. 1 is a block diagram for illustrating the schematic configuration of the image pickup apparatus according to this embodiment.

Note that, a case where an image pickup apparatus is a lens-interchangeable type digital single-lens reflex camera is described herein as an example, but the present invention is not limited thereto.

An image pickup apparatus (camera) 10 according to this embodiment includes a lens unit 100 and an image pickup apparatus main body (camera main body, body) 120. The lens unit 100 is connected to the image pickup apparatus main body (camera main body) 120 via a mount M indicated by the dotted lines at a center portion of FIG. 1.

The lens unit 100 includes a photographing lens 105 and a lens driving/controlling system 119.

The photographing lens 105 is configured to form an optical image of an object, that is, an object image. The photographing lens 105 includes a first lens group 101, a diaphragm shutter 102, a second lens group 103, and a focus lens group (hereinafter referred to as "focus lens") 104. The first lens group 101, the diaphragm shutter 102, the second lens group 103, and the focus lens 104 construct an imaging optical system (photographing optical system, image pickup optical system) 133 configured to form an image of an object on an image pickup element 122.

The lens driving/controlling system 119 is configured to drive or control the lens unit 100. The lens driving/controlling system 119 includes a zoom actuator 111, a diaphragm shutter actuator 112, a focus actuator 113, a zoom driving circuit 114, a diaphragm shutter driving circuit 115, a focus driving circuit 116, and a lens microprocessor unit (MPU) 117. The lens driving/controlling system 119 further includes a lens memory 118.

The first lens group 101 is arranged at a leading end portion of the lens unit 100, and is held to be advanceable and retreatable in an optical axis direction OA. The diaphragm shutter 102 is configured to adjust its aperture diameter to adjust a light amount during photographing. Further, the diaphragm shutter 102 also has a function as an exposure-time adjusting shutter at the time of taking a still image. The diaphragm shutter 102 and the second lens group 103 are integrally operated in an advancing or retreating manner in the optical axis direction OA. Interlocking of the advancing/retreating operation of the second lens group 103 and the advancing/retreating operation of the first lens group 101 realizes a zoom function. Further, the focus lens 104 is advanced or retreated in the optical axis direction OA for focusing.

The zoom driving circuit 114 is configured to drive the zoom actuator 111 based on a zoom operation performed by a photographer to operate the first lens group 101 and the second lens group 103 in an advancing or retreating manner in the optical axis direction OA, to thereby perform the zoom operation. The diaphragm shutter driving circuit 115 is configured to drive the diaphragm shutter actuator 112 to control the aperture diameter of the diaphragm shutter 102, to thereby adjust the light amount during photographing. Further, the diaphragm shutter driving circuit 115 also controls exposure time at the time of taking a still image. The focus driving circuit 116 is configured to drive the focus actuator 113 based on the focus detection result to operate the focus lens 104 in an advancing or retreating manner in the optical axis direction OA for focusing. Further, the focus actuator 113 also has a function as a lens position detecting portion configured to detect the current position of the focus lens 104.

The lens MPU 117 is configured to perform various computing processing for the lens unit 100, to thereby control the entire lens unit 100. The lens MPU 117 controls the zoom driving circuit 114, the diaphragm shutter driving circuit 115, the focus driving circuit 116, and the lens memory 118. Further, the lens MPU 117 is configured to detect the current lens position to notify a camera MPU 125 to be described later of lens position information based on a request from the camera MPU 125. The lens position information includes information such as the position of the focus lens 104 on the optical axis, the diameter and the position on the optical axis of an exit pupil of the imaging optical system 133, and the diameter and the position on the optical axis of a lens frame (not shown) for limiting the light fluxes of the exit pupil. The lens memory 118 is configured to store optical information required for automatic focusing (auto-focus), lens light field data to be described later, and other information.

On the other hand, the image pickup apparatus main body 120 includes an optical low pass filter (LPF) 121, the image pickup element 122, and an image pickup apparatus controlling/driving system (camera controlling/driving system) 131.

The image pickup apparatus controlling/driving system 131 includes an image pickup element driving circuit 123, an image processing circuit 124, the camera MPU 125, a display device 126, an operation switch group 127, a memory 128, an image pickup surface phase-difference focus detection portion 129, and a TVAF focus detection portion 130.

The optical LPF 121 is configured to reduce the false color and moire of the photographed image.

The image pickup element 122 is, for example, a CMOS image sensor. As described later, the image pickup element 122 can output a signal for performing phase-difference focus detection (image pickup surface phase-difference AF). Among pieces of image data acquired by the image pickup element 122, image data that may be used for the image pickup surface phase-difference AF is converted into focus detection image data (focus detection signal) by the image processing circuit 124, which is then input to the camera MPU 125. On the other hand, among the pieces of image data acquired by the image pickup element 122, image data that may be used for display, recording, or contrast focus detection is subjected to predetermined processing by the image processing circuit 124 depending on the purpose, which is then input to the camera MPU 125.

The image pickup element driving circuit 123 is configured to control the operation of the image pickup element 122. The image pickup element driving circuit 123 is configured to subject the image signal acquired by the image pickup element 122 to A/D conversion, which is then output to the camera MPU 125 and the image processing circuit 124. The image processing circuit 124 is configured to subject the image data acquired by the image pickup element 122 to γ conversion, color interpolation, JPEG compression, and other processing.

The camera MPU (image pickup apparatus MPU) 125 is configured to perform various computing processing for the image pickup apparatus main body 120, to thereby control the entire image pickup apparatus main body 120. The camera MPU 125 is configured to control the image pickup element driving circuit 123, the image processing circuit 124, the display device 126, the operation switch group 127, the memory 128, the image pickup surface phase-difference focus detection portion 129, and the TVAF focus detection portion 130. Further, the camera MPU 125 is connected to the lens MPU 117 via a signal line of the mount M. The camera MPU 125 is configured to output, to the lens MPU 117, a lens position information acquiring request for requesting acquisition of the lens position information, or a lens driving request for requesting drive of the lens at a predetermined driving amount. Further, the camera MPU 125 is configured to acquire optical information specific to the lens unit 100.

The camera MPU 125 incorporates a ROM 125*a* having stored thereon a program for controlling the operation of the image pickup apparatus, a RAM 125*b* configured to store variables, and an EEPROM 125*c* configured to store sensor light-receiving intensity characteristics and various parameters.

The camera MPU 125 is configured to perform computation for generating a point image intensity distribution to be described later based on the lens light field data to be described later and the sensor light-receiving intensity characteristic to be described later.

Note that, as described above, in this embodiment, the lens light field data is stored in, for example, the lens memory 118, and the sensor light-receiving intensity characteristic is stored in, for example, the EEPROM 125*c*. The lens memory 118 functions as a storage portion on the lens unit 100 side (imaging optical system side), and the EEPROM 125*c* functions as a storage portion on the image pickup apparatus main body 120 side.

The display device 126 includes an LCD and the like. The display device 126 is configured to display information relating to a photographing mode of the image pickup apparatus, a preview image prior to photographing, a confirming image after photographing, a display image in an in-focus state at the time of focus detection, and the like. The operation switch group 127 includes a power supply switch, a release (photographing trigger) switch, a zoom operation switch, a photographing mode selecting switch, and the like. The memory 128 is, for example, a removable memory such as a flash memory. The memory 128 is configured to record a photographed image.

The image pickup surface phase-difference focus detection portion 129 is configured to perform phase-difference focus detection (image pickup surface phase-difference AF) based on the focus detection image data (focus detection signal) obtained through the image processing by the image processing circuit 124. That is, the image pickup surface phase-difference focus detection portion 129 performs the image pickup surface phase-difference AF based on a shift amount of a pair of images formed on divided pixels 201 and 202 (see FIG. 2) by light fluxes passing through a pair of pupil regions of the photographing optical system 133. Note that, the image pickup surface phase-difference AF is described in detail later.

The TVAF focus detection portion 130 is configured to calculate a TVAF evaluation value based on a contrast component of the image information obtained through the image processing by the image processing circuit 124, to thereby perform contrast focus detection processing (TVAF). In the contrast focus detection processing, the TVAF evaluation value is calculated at a plurality of focus lens positions while moving the focus lens 104, to thereby detect the focus lens position having the maximum TVAF evaluation value. The TVAF evaluation value is increased as the image comes into focus, and is the maximum at a focal point.

[Image Pickup Element]

Figure 2:
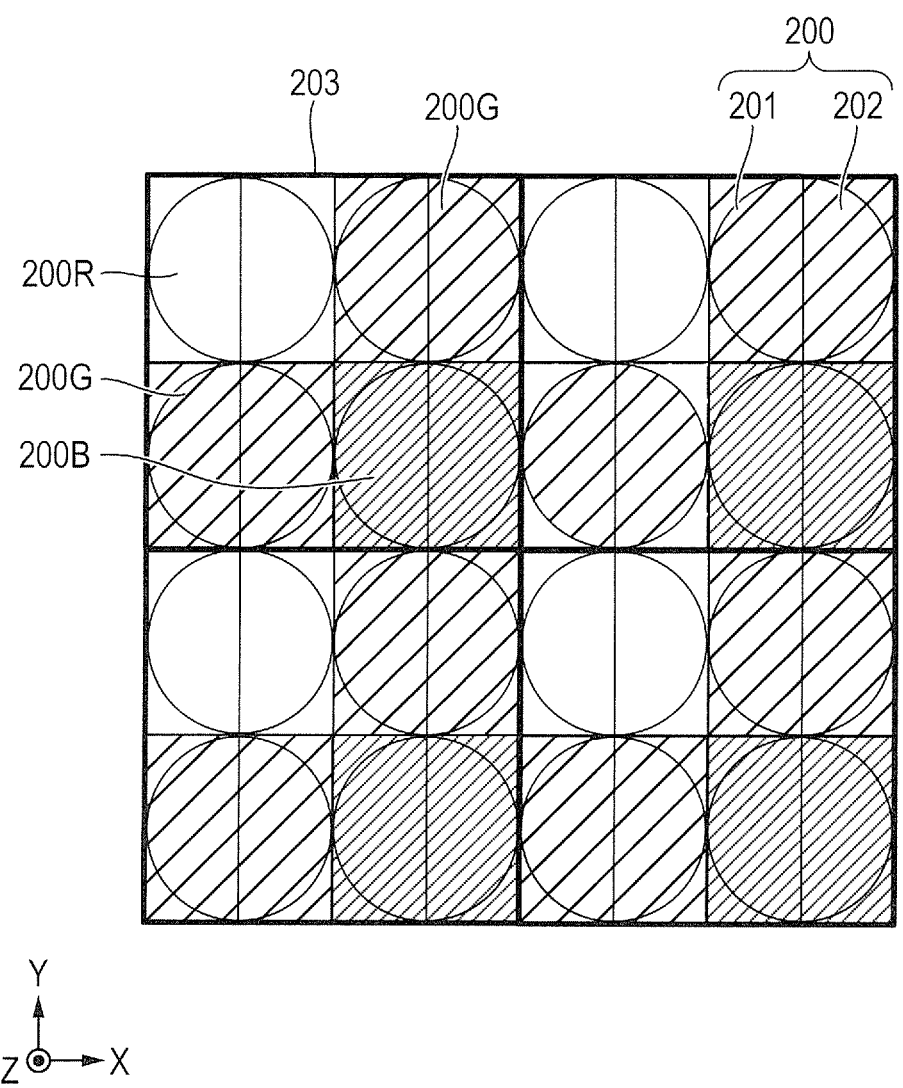
FIG. 2 is a plan view for illustrating a part of an image pickup element to be used in the image pickup apparatus according to the first embodiment of the present invention.

Next, the image pickup element to be used in the image pickup apparatus according to this embodiment is described. FIG. 2 is a plan view for illustrating a part of the image pickup element to be used in the image pickup apparatus according to this embodiment.

The image pickup element 122 to be used in this embodiment is, as described above, a CMOS image sensor, for example. In a pixel array region (not shown) of the image pickup element 122, image pickup pixels (pixels) 200 (see FIG. 2) are two-dimensionally arranged, that is, arranged in matrix. Around the pixel array region, peripheral circuits (not shown) including a read-out circuit are arranged. In FIG. 2, reference symbol 200R is used to represent an image pickup pixel responding to red color (R), reference symbol 200G is used to represent an image pickup pixel responding to green color (G), and reference symbol 200B is used to represent an image pickup pixel responding to blue color (B). Reference symbol 200 is used to describe the image pickup pixel unless otherwise required to particularly distinguish the responding colors.

Each of the image pickup pixels 200 includes two divided pixels (divided regions) 201 and 202. That is, each of the image pickup pixels 200 includes a first divided pixel 201 and a second divided pixel 202 arranged in 2 columns and 1 row. The center of gravity of the first divided pixel 201 is decentered in a −X direction in the image pickup pixel 200.

The center of gravity of the second divided pixel 202 is decentered in a +X direction in the image pickup pixel 200.

In FIG. 2, the arrangement of the image pickup pixels 200 of 4 columns and 4 rows is extracted and illustrated. One image pickup pixel 200 includes two divided pixels 201 and 202, and hence, in FIG. 2, the arrangement of the divided pixels 201 and 202 of 8 columns and 4 rows is extracted and illustrated.

The image pickup pixels 200 of 2 columns and 2 rows form one pixel group 203. In FIG. 2, each of the pixel groups 203 is represented with use of the thick solid lines. One pixel group 203 includes one image pickup pixel 200R responding to red color, two image pickup pixels 200G responding to green color, and one image pickup pixel 200B responding to blue color. The image pickup pixel 200R responding to red color is arranged at an upper left position of the pixel group 203. The image pickup pixels 200G responding to green color are arranged at upper right and lower left positions of the pixel group 203. The image pickup pixel 200B responding to blue color is arranged at a lower right position of the pixel group 203. Such a pixel arrangement is called a Bayer pattern.

A large number of the pixel groups 203 as described above are arranged two-dimensionally on an image pickup surface (light receiving surface) of the image pickup element 122, and hence the image pickup element 122 can acquire a clear and highly-accurate photographed image.

A pitch (cycle) P of the image pickup pixels 200 is set to, for example, 4 μm. The number of the image pickup pixels 200 arranged in a row direction (X axis direction) is set to, for example, 5,575, and the number of the image pickup pixels 200 arranged in a column direction (Y axis direction) is set to, for example, 3,725. That is, the number N of pixels (effective pixel number) of the image pickup element 122 is set to, for example, about 20,750,000 pixels. Note that, the horizontal direction (row direction, lateral direction) of the image pickup element 122 (right-left direction of the drawing sheet of FIG. 2) is represented by an X axis direction, and the perpendicular direction (column direction, vertical direction) of the image pickup element 122 (up-down direction of the drawing sheet of FIG. 2) is represented by a Y axis direction. Further, a direction normal to the image pickup surface of the image pickup element 122 (direction normal to the drawing sheet of FIG. 2) is represented by a Z axis direction.

As described above, each of the image pickup pixels 200 includes the first divided pixel 201 and the second divided pixel 202 arranged in 2 columns and 1 row. Therefore, a pitch (cycle) $P_{AF}$ of the divided pixels 201 and 202 in the row direction (X axis direction) is, for example, 2 μm. The number of the divided pixels 201 and 202 in the row direction (X axis direction) is, for example, 11,150. The number of the divided pixels 201 and 202 in the column direction (Y axis direction) is, for example, 3,725. The number $N_{AF}$ of the divided pixels of the image pickup element 122 is, for example, about 41,500,000 pixels.

Figure 3A:
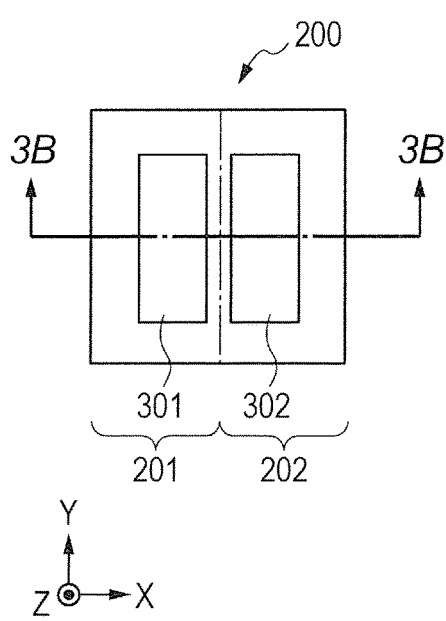
FIG. 3A and FIG. 3B are respectively a plan view and a sectional view for illustrating a pixel portion of the image pickup element.
Figure 3B:
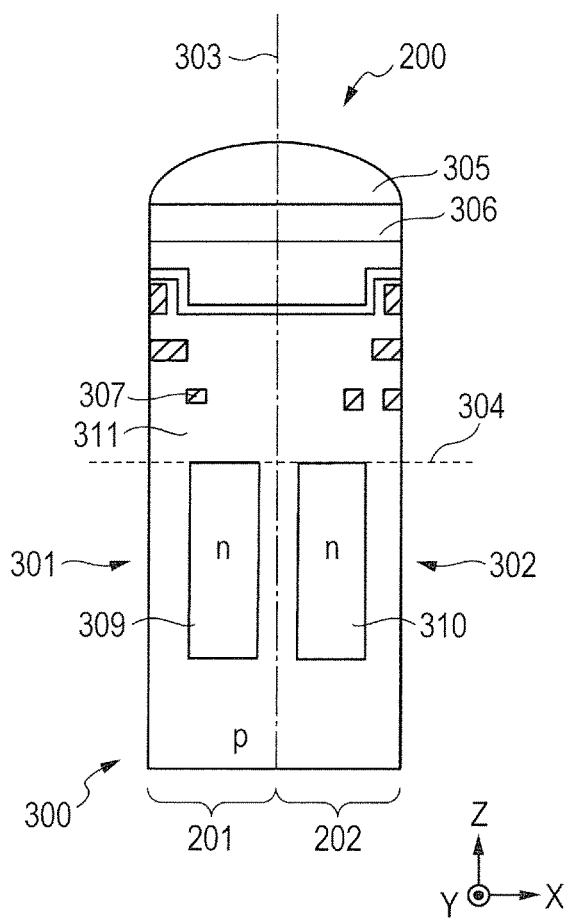

FIG. 3A and FIG. 3B are respectively a plan view and a sectional view for illustrating a pixel portion of the image pickup element. FIG. 3A is a plan view for illustrating the pixel portion of the image pickup element, and FIG. 3B is a sectional view taken along the line 3B-3B of FIG. 3A. In FIG. 3B, an optical axis 303 is represented by using the dashed-dotted line, and a light receiving surface (image pickup surface) 304 of the image pickup element 122 is represented by using the broken line. In FIG. 3A and FIG. 3B, one of the plurality of pixels (image pickup pixels, pixel portions) 200 of the image pickup element is extracted and illustrated.

As illustrated in FIG. 3A and FIG. 3B, each of the image pickup pixels 200 is divided into a plurality of regions (divided pixels) 201 and 202. Specifically, the image pickup pixel 200 is divided into two regions in the X direction, but is not divided in the Y direction. As described above, in this embodiment, each of the image pickup pixels 200 is divided into the two regions 201 and 202.

In one divided pixel 201, a photoelectric converter (first photoelectric converter) 301 of the first divided pixel 201 is formed in a substrate 300. In the other divided pixel 202, a photoelectric converter (second photoelectric converter) 302 of the second divided pixel 202 is formed in the substrate 300. The center of gravity of the first photoelectric converter 301 is decentered in the −X direction. The center of gravity of the second photoelectric converter 302 is decentered in the +X direction.

Examples of the photoelectric converters 301 and 302 include a p-i-n structure photodiode in which an intrinsic layer is sandwiched between a p-type layer and an n-type layer.

Note that, each of the photoelectric converters 301 and 302 is not limited to a p-i-n structure photodiode, and may be a p-n junction photodiode in which the intrinsic layer is omitted.

On the substrate 300 having the photoelectric converters 301 and 302 formed therein, an insulating layer 311, a wiring layer 307, and the like are formed as appropriate. On the substrate 300 having the insulating layer 311, the wiring layer 307, and the like formed thereon, a color filter 306 is formed.

Note that, the spectral transmittance of the color filter 306 may be varied for each of the image pickup pixels 200R, 200G, and 200B, or the color filter 306 may be omitted as appropriate.

On the substrate 300 having the color filter 306 formed thereon, a microlens 305 is arranged, which is configured to collect light entering each of the image pickup pixels 200.

The light entering each of the pixels 200 is collected by the microlens 305 to be dispersed by the color filter 306, and then reaches the first photoelectric converter 301 and the second photoelectric converter 302.

In the photoelectric converters 301 and 302, electrons and holes are pair-produced based on the light receiving amount. The pair-produced electrons and holes are separated at a depletion layer. The electrons being negative charges are accumulated in n-type layers 309 and 310, and the holes being positive charges are discharged outside of the image pickup element 122 through p-type layers connected to a constant voltage source (not shown).

The electrons accumulated in the respective n-type layers 309 and 310 of the photoelectric converters 301 and 302 are transferred to a capacitance portion (FD) (not shown) via a transfer gate (not shown), to thereby be converted into voltage signals.

Figure 4:
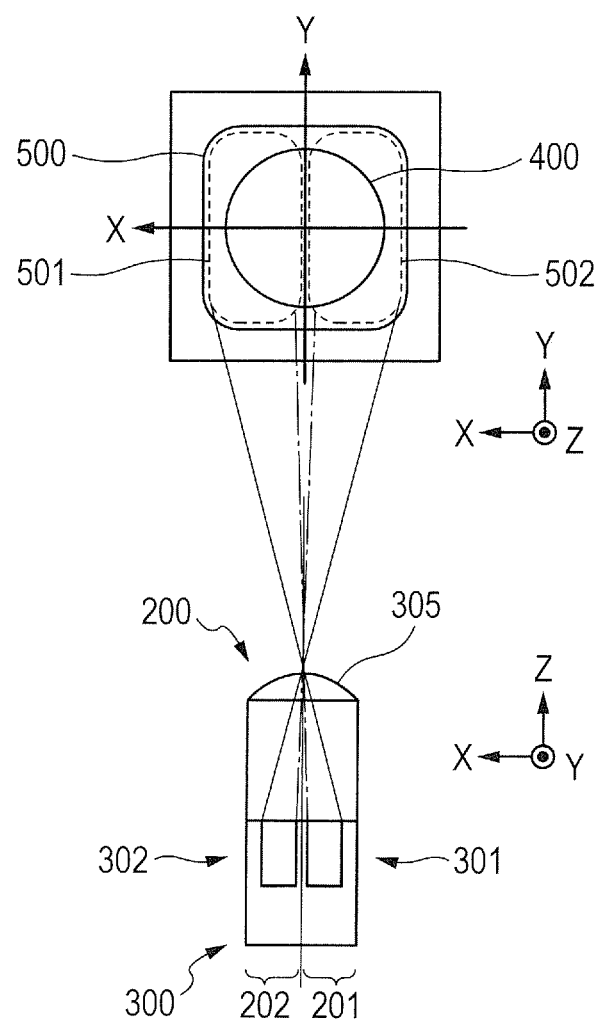
FIG. 4 is a schematic diagram for illustrating a relationship between an exit pupil and the pixel portion.

FIG. 4 is a schematic diagram for illustrating a correspondence relationship between the pupil region and the pixel portion. The diagram in the lower part of FIG. 4 is a sectional view of the pixel portion, and the diagram in the upper part of FIG. 4 is a plan view of an exit pupil plane as viewed from the pixel portion side.

As illustrated in FIG. 4, a pupil region (exit pupil) 500 includes a first pupil partial region 501 and a second pupil partial region 502.

The center of gravity of the first pupil partial region 501 is decentered in the +X direction in the pupil region 500. On the other hand, as described above, the center of gravity of the first divided pixel 201 is decentered in the −X direction in the image pickup pixel 200. Further, the microlens 305 is present between the pupil region 500 and the pixel portion 200. Therefore, the first pupil partial region 501 and the first divided pixel 201 have a conjugate relationship, and the light flux passing through the first pupil partial region 501 is received in the first divided pixel 201.

The center of gravity of the second pupil partial region 502 is decentered in the −X direction in the pupil region 500. On the other hand, as described above, the center of gravity of the second divided pixel 202 is decentered in the +X direction in the image pickup pixel 200. Further, the microlens 305 is present between the pupil region 500 and the pixel portion 200. Therefore, the second pupil partial region 502 and the second divided pixel 202 have a conjugate relationship, and the light flux passing through the second pupil partial region 502 is received in the second divided pixel 202.

As described above, the pupil region 500 includes the first pupil partial region 501 and the second pupil partial region 502. Further, as described above, the image pickup pixel 200 includes the first divided pixel 201 and the second divided pixel 202. Therefore, the light fluxes passing through the pupil region 500 including the first pupil partial region 501 and the second pupil partial region 502 are received by the image pickup pixel 200 including the first divided pixel 201 and the second divided pixel 202.

Figure 5:
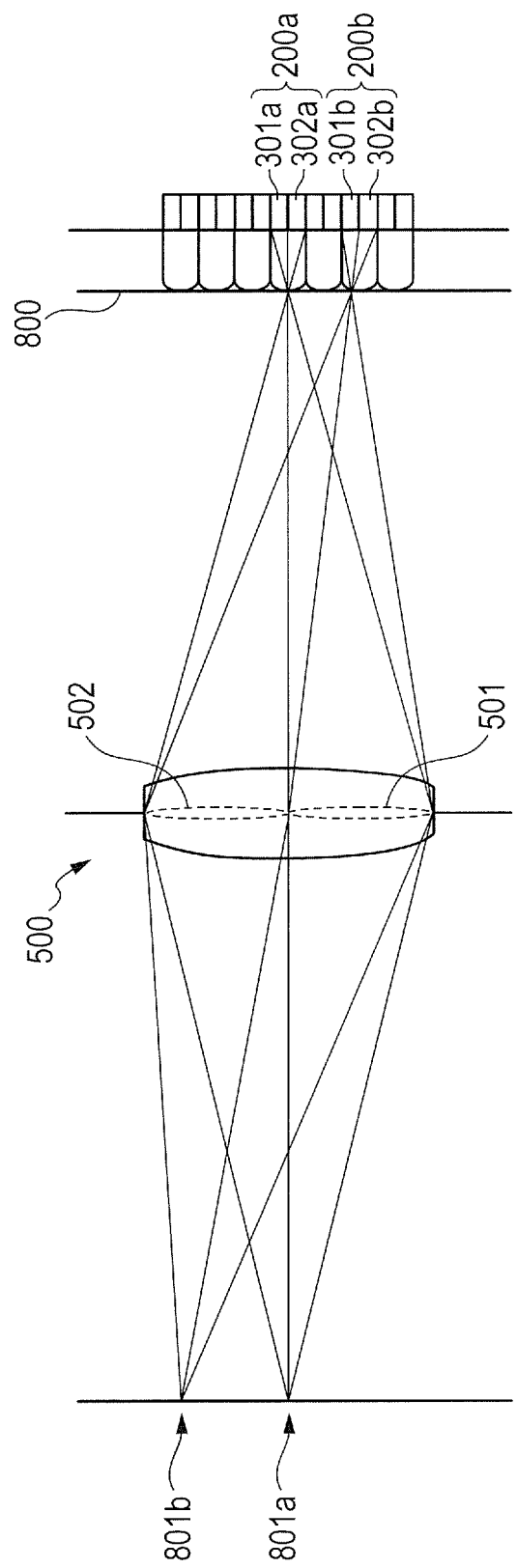
FIG. 5 is a schematic diagram for illustrating a relationship between the exit pupil and the image pickup element.

FIG. 5 is a schematic diagram for illustrating a relationship between the exit pupil and the image pickup element.

A plurality of light fluxes emitted from a certain point 801a respectively pass through the different pupil partial regions 501 and 502 to be received by a first divided pixel 301a and a second divided pixel 302a of a certain pixel 200a, respectively.

Further, a plurality of light fluxes emitted from another point 801b respectively pass through the different pupil partial regions 501 and 502 to be received by a first divided pixel 301b and a second divided pixel 302b of another pixel 200b, respectively.

Note that, description is made herein of a case where the pupil region 500 is divided into two regions in the horizontal direction (X direction) as an example, but the present invention is not limited thereto. As necessary, the pupil region 500 may be divided in the perpendicular direction (Y direction).

Further, description is made herein of a case where the image pickup pixel 200 includes the first divided pixel 201 and the second divided pixel 202 as an example, but a first focus detection pixel and a second focus detection pixel may be arranged as appropriate separately from the image pickup pixel 200.

A first focus detection signal (first focus detection image data) is formed of an aggregate of signals (light receiving signals) detected by the respective first divided pixels 201 of the image pickup pixels 200 arranged in matrix in the image pickup element 122. Further, a second focus detection signal (second focus detection image data) is formed of an aggregate of signals (light receiving signals) detected by the respective second divided pixels 202 of the image pickup pixels 200 arranged in matrix in the image pickup element 122. The thus obtained first focus detection signal and second focus detection signal are used for focus detection. Further, an image pickup signal of the effective pixel number N (image pickup image) is formed of an aggregate of signals obtained by adding signals detected by the respective first divided pixels 201 and signals detected by the respective second divided pixels 202.

[Overview of Auto-Focus Operation]

Figure 6:
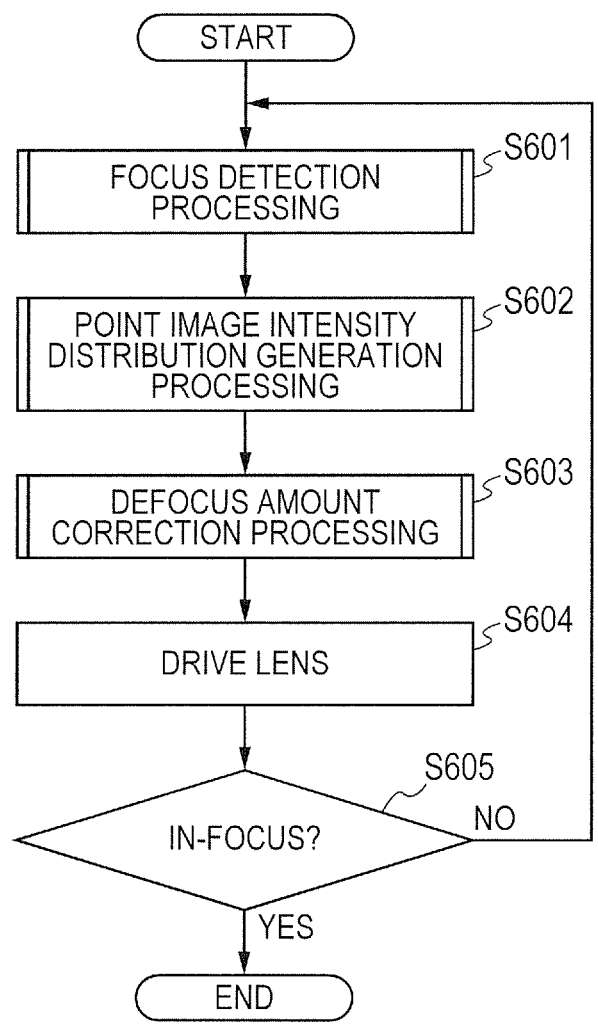
FIG. 6 is a flow chart for illustrating an overview of processing of an auto-focus operation of the image pickup apparatus according to the first embodiment of the present invention.

Next, an overview of processing of an auto-focus operation of the image pickup apparatus according to this embodiment is described with reference to FIG. 6. FIG. 6 is a flow chart for illustrating the overview of the processing of the auto-focus operation of the image pickup apparatus according to this embodiment.

First, as illustrated in FIG. 6, focus detection processing is performed (Step S601). In the focus detection processing, the defocus amount is calculated as described later with reference to FIG. 7.

Next, point image intensity distribution generation processing is performed (Step S602). Specifically, point image intensity distribution of a plurality of positions in the vicinity of the defocus amount calculated in Step S601 are generated. The point image intensity distribution generation processing is performed by the camera MPU 125 that may function as a point image intensity distribution generating unit (point image intensity distribution generating portion). In this embodiment, the point image intensity distributions are generated as described above to enable highly-accurate correction of the defocus amount calculated in the focus detection processing (Step S601) and eventually enable setting of a best image plane position.

Next, defocus amount correction processing is performed (Step S603). Specifically, a correction value is calculated with use of the point image intensity distributions of the respective plurality of defocus amounts, which are obtained in the point image intensity distribution generation processing (Step S602), and the defocus amount calculated in the focus detection processing (Step S601) is corrected with use of the correction value.

Next, the photographing lens 105 is driven (Step S604). Specifically, the photographing lens 105 is driven based on the corrected defocus amount obtained in the defocus amount correction processing (Step S603).

Next, in-focus determination processing is performed (Step S605). When it is determined to be in-focus (YES in Step S605), the auto-focus operation is ended.

On the other hand, when it is determined to be out-of-focus (NO in Step S605), the processing returns to Step S601 to perform the processing of the auto-focus operation again.

The auto-focus operation of the image pickup apparatus according to this embodiment, which is illustrated in FIG. 6 as an overview, is described in detail below.

[Focus Detection]

The focus detection processing (Step S601) schematically described with reference to FIG. 6 is described in detail below, but prior to the specific description of the focus detection processing, the relationship between the defocus amount and the image shift amount is described with reference to FIG. 8.

Figure 8:
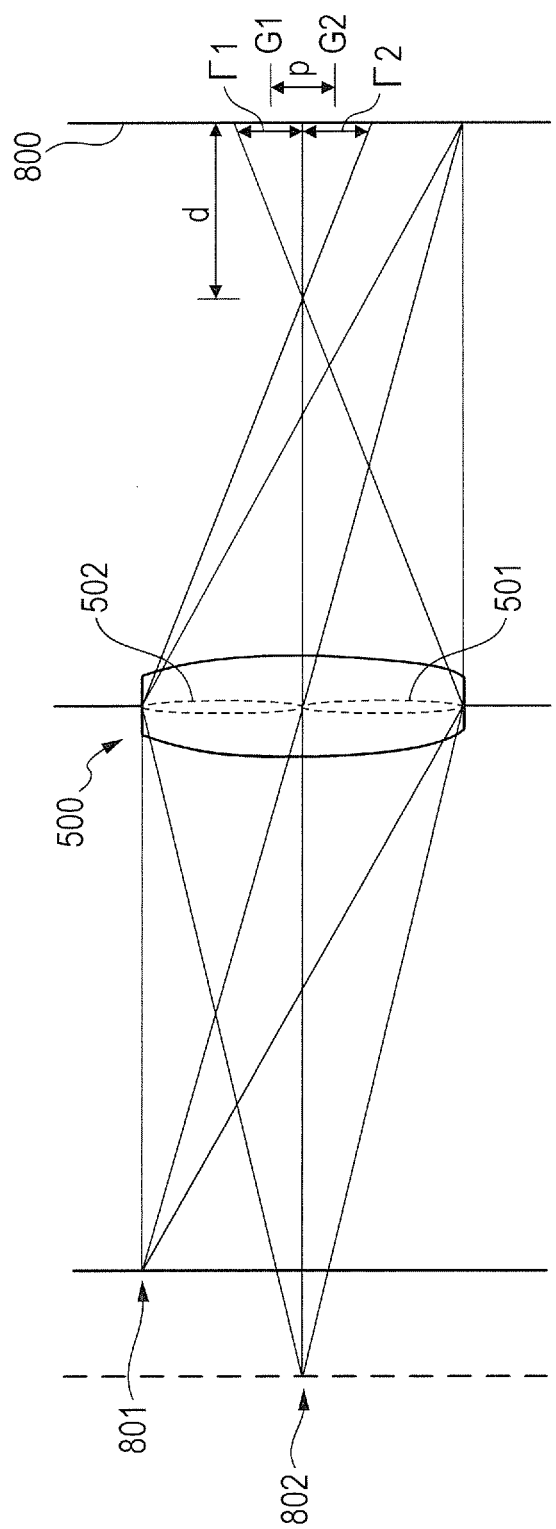
FIG. 8 is a diagram for illustrating a relationship between a defocus amount and an image shift amount.

FIG. 8 is a diagram for illustrating the relationship between the defocus amount and the image shift amount. Note that, the above-mentioned image pickup element 122 is arranged at an image pickup surface 800, but the illustration thereof is omitted in FIG. 8. As described above with reference to FIG. 4 and FIG. 5, the exit pupil 500 of the imaging optical system is divided into two regions, that is, the first pupil partial region 501 and the second pupil partial region 502.

Symbol d in FIG. 8 represents a distance between an imaging position (imaging point) of the object and the image pickup surface, that is, a defocus amount. The magnitude of the defocus amount d is represented by |d|. Under a state in which the imaging position of the object is located on the front side of the image pickup surface, that is, in a front focus state, the sign of the defocus amount is negative (d<0). Under a state in which the imaging position of the object is located on the rear side of the image pickup surface, that is, in a rear focus state, the sign of the defocus amount is positive (d>0). Under a state in which the imaging position of the object is located at the image pickup surface, that is, in an in-focus state, the defocus amount d is 0.

When an object 801 is positioned as illustrated in FIG. 8, the in-focus state (d=0) is obtained. Further, when an object 802 is positioned as illustrated in FIG. 8, the front focus state (d<0) is obtained. Both of the front focus state (d<0) and the rear focus state (d>0) correspond to a defocus state (|d|>0).

In the front focus state (d<0), among the light fluxes from the object 802, the light fluxes passing through the first pupil partial region 501 are collected on the front side of the image pickup surface 800, and then are spread with a width Γ1 having a gravity-center position G1 of the light fluxes as the center, to thereby form a blurred image on the image pickup surface 800. The blurred image reaching the image pickup surface 800 is received by the first divided pixel 201 of the image pickup pixel 200 arranged in the image pickup element 122, to thereby generate the first focus detection signal. In this manner, the image of the object 802 with the blur width of Γ1 is detected as the first focus detection signal at the gravity-center position G1 on the image pickup surface 800.

Further, in the front focus state (d<0), among the light fluxes from the object 802, the light fluxes passing through the second pupil partial region 502 are collected on the front side of the image pickup surface 800, and then are spread with a width Γ2 having a gravity-center position G2 of the light fluxes as the center, to thereby form a blurred image on the image pickup surface 800. The blurred image reaching the image pickup surface 800 is received by the second divided pixel 202 of the image pickup pixel 200 arranged in the image pickup element 122, to thereby generate the second focus detection signal. In this manner, the image of the object 802 with the blur width of Γ2 is detected as the second focus detection signal at the gravity-center position G2 on the image pickup surface 800.

The blur widths Γ1 and Γ2 of the object image are increased substantially in proportion to the increase of the magnitude |d| of the defocus amount d. Further, a magnitude |p| of an image shift amount p between the object image represented by the first focus detection signal and the object image represented by the second focus detection signal (difference between the gravity-center positions of the light fluxes (G1-G2)) is also increased substantially in proportion to the increase of the magnitude |d| of the defocus amount d.

The case of the rear focus state (d>0) is similar to the case of the front focus state except that the direction of the image shift between the object image represented by the first focus detection signal and the object image represented by the second focus detection signal is opposite to the direction of the case of the front focus state.

The defocus amount and the image shift amount have the above-mentioned relationship therebetween. That is, as the magnitude of the defocus amount d is increased, the magnitude of the image shift amount p between the object image represented by the first focus detection signal and the object image represented by the second focus detection signal is increased. Such a relationship is satisfied, and hence the defocus amount d can be calculated based on the image shift amount p, that is, the phase difference. The focus detection in which the defocus amount is detected based on the phase difference (image shift amount) is referred to as phase-difference focus detection.

In the phase-difference focus detection, the first focus detection signal and the second focus detection signal are shifted relatively to each other to calculate a correlation amount representing the degree of matching of those focus detection signals, to thereby detect the image shift amount p based on the shift amount when a satisfactory correlation (degree of matching of the signals) is obtained. As the magnitude of the defocus amount d is increased, the magnitude of the image shift amount p between the object image represented by the first focus detection signal and the object image represented by the second focus detection signal is increased, and hence the image shift amount p can be converted into the defocus amount d. The defocus amount calculated based on the image shift amount p is referred to as detected defocus amount (calculated defocus amount). The detected defocus amount does not always completely match with the actual defocus amount (real defocus amount). Therefore, in this embodiment, the calculated defocus amount (Step S706) is subjected to correction processing (Step S2105) as described later.

Figure 7:
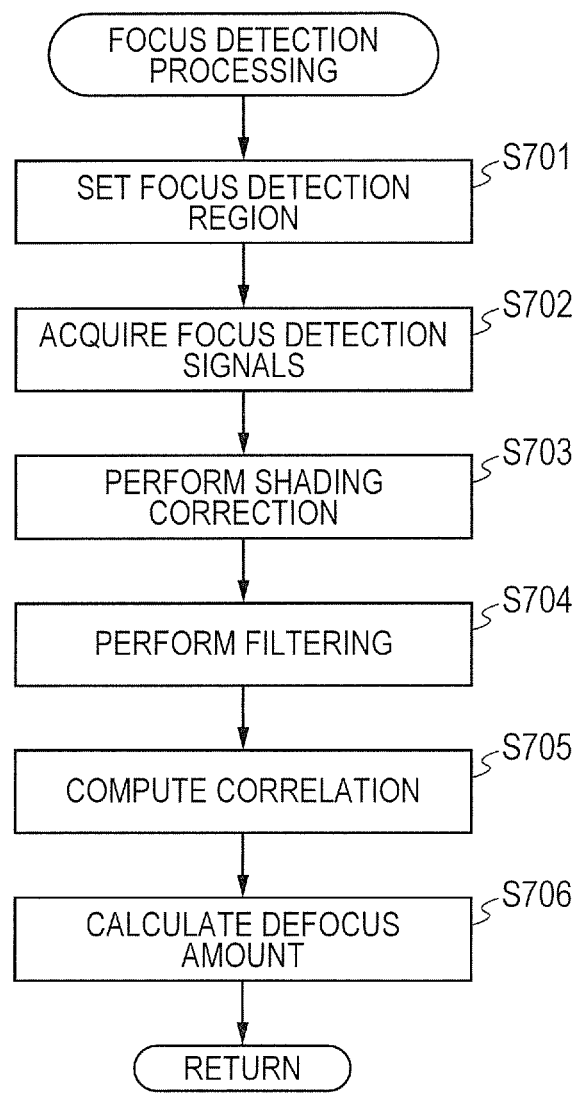
FIG. 7 is a flow chart for illustrating focus detection processing in the image pickup apparatus according to the first embodiment of the present invention.

FIG. 7 is a flow chart for illustrating the focus detection processing in the image pickup apparatus according to this embodiment. FIG. 7 is a flow chart for describing details of the focus detection processing (Step S601) schematically described with reference to FIG. 6.

The focus detection processing illustrated in FIG. 7 is executed by the image pickup element 122, the image processing circuit 124, the camera MPU 125, and the image pickup surface phase-difference focus detection portion 129 in cooperation with each other. Those components function as a focus detection signal generating unit (focus detection signal generating portion) and a focus detection unit (focus detection portion).

First, a region on the image pickup element 122 corresponding to the position of the object (object to be focused) is set as a focus detection region (not shown) (Step S701).

Next, the focus detection signal generating unit acquires the first focus detection signal generated from the light receiving signals of the first divided pixels 201 in the focus detection region and the second focus detection signal generated from the light receiving signals of the second divided pixels 202 in the focus detection region (Step S702).

Next, each of the first focus detection signal and the second focus detection signal is subjected to shading correction processing (optical correction processing) (Step S703).

Figure 9C:
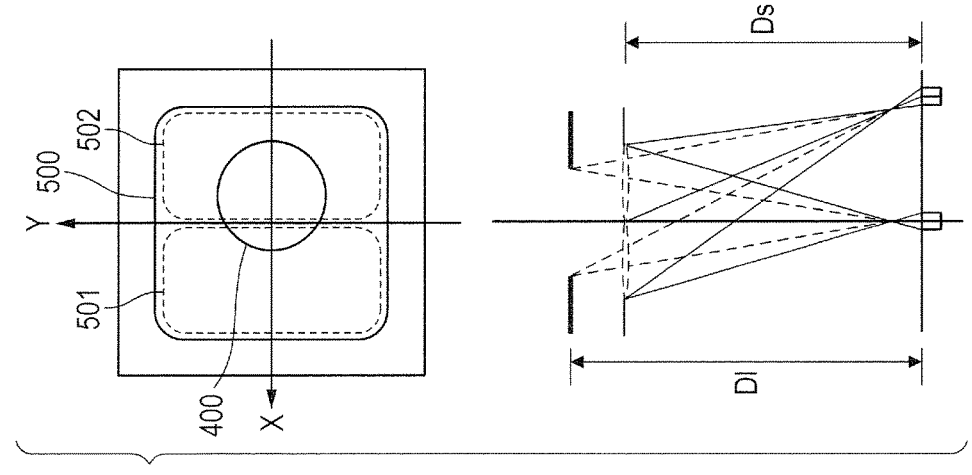
FIG. 9A, FIG. 9B, and FIG. 9C are schematic diagrams for describing shading.
Figure 9B:
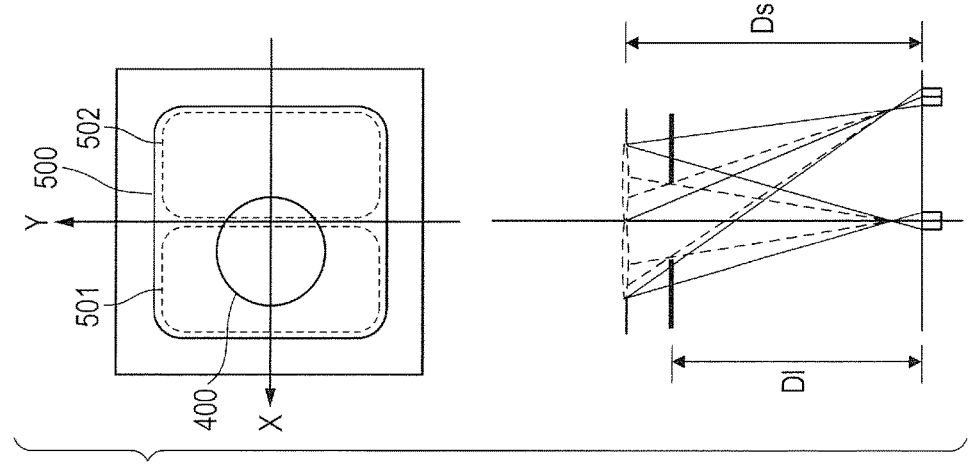
Figure 9A:
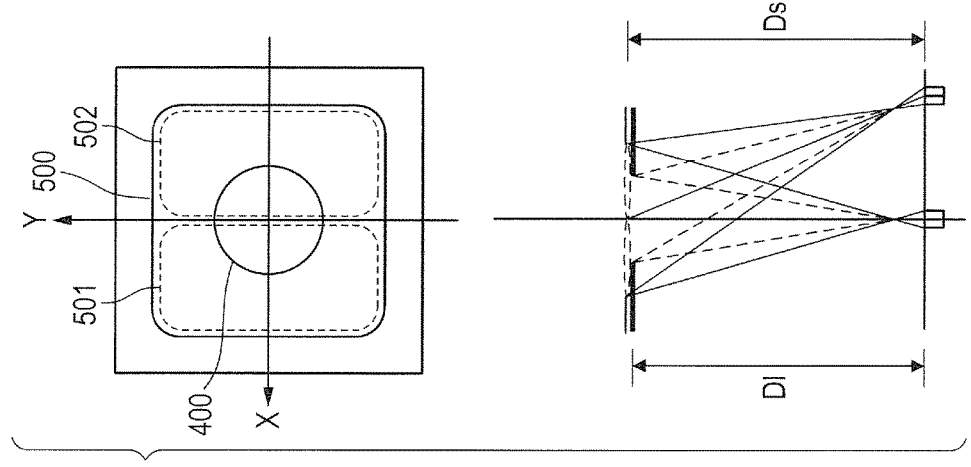

Now, the shading is described with reference to FIG. 9A to FIG. 9C. FIG. 9A to FIG. 9C are schematic views for describing the shading.

FIG. 9A is an illustration of a case where an exit pupil distance Dl of the imaging optical system 133 is equal to an exit pupil distance Ds defined on the image pickup element side. In this case, at both of a center image height and a peripheral image height, light fluxes passing through an exit pupil 400 of the imaging optical system 133 are divided substantially equally by the first pupil partial region 501 and the second pupil partial region 502.

FIG. 9B is an illustration of a case where the exit pupil distance Dl of the imaging optical system 133 is shorter than the exit pupil distance Ds defined on the image pickup element side. In this case, at the peripheral image height, pupil shift occurs between the exit pupil of the imaging optical system 133 and the entrance pupil of the image pickup element 122. Therefore, the light fluxes passing through the exit pupil 400 of the imaging optical system 133 are unevenly divided by the first pupil partial region 501 and the second pupil partial region 502. That is, as illustrated in FIG. 9B, when the exit pupil distance Dl of the imaging optical system 133 is shorter than the exit pupil distance Ds defined on the image pickup element side, the pupil division is uneven at the peripheral image height.

FIG. 9C is an illustration of a case where the exit pupil distance Dl of the imaging optical system 133 is longer than the exit pupil distance Ds defined on the image pickup element side. Also in this case, at the peripheral image height, pupil shift occurs between the exit pupil of the imaging optical system 133 and the entrance pupil of the image pickup element 122. Therefore, the light fluxes passing through the exit pupil 400 of the imaging optical system 133 are unevenly divided by the first pupil partial region 501 and the second pupil partial region 502. That is, as illustrated in FIG. 9C, also when the exit pupil distance Dl of the imaging optical system 133 is longer than the exit pupil distance Ds defined on the image pickup element side, the pupil division is uneven at the peripheral image height.

When the pupil division is uneven at the peripheral image height, the intensities of the first focus detection signal and the second focus detection signal also become uneven. That is, the intensity of one of the first focus detection signal and the second focus detection signal is increased, while the intensity of the other is decreased. Such a phenomenon is called shading.

In the phase-difference focus detection, based on the correlation between the first focus detection signal and the second focus detection signal (degree of matching of the signals), the detected defocus amount (in-focus position) is calculated. When the shading occurs due to the pupil shift, there is a case where the correlation between the first focus detection signal and the second focus detection signal (degree of matching of the signals) is reduced. Therefore, in the phase-difference focus detection, in order to improve the correlation between the first focus detection signal and the second focus detection signal (degree of matching of the signals) and enhance the focus detection accuracy, shading correction processing (optical correction processing) is desired to be performed.

The shading correction processing is performed as follows.

First, based on the image height of the focus detection region and the F value and the exit pupil distance of the photographing lens (imaging optical system), a first shading correction coefficient for correcting the first focus detection signal and a second shading correction coefficient for correcting the second focus detection signal are generated.

Then, the first focus detection signal is multiplied by the first shading correction coefficient, and the second focus detection signal is multiplied by the second shading correction coefficient.

In this way, the first focus detection signal and the second focus detection signal are subjected to shading correction processing (optical correction processing) (Step S703).

Figure 10:
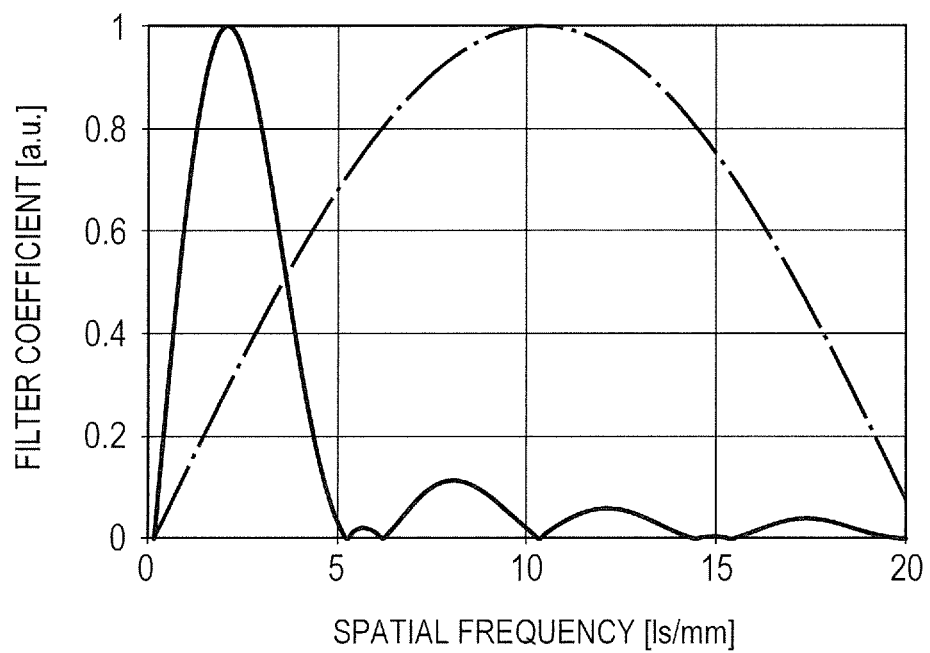
FIG. 10 is a graph for showing frequency characteristics of a filter.

Next, the first focus detection signal and the second focus detection signal are subjected to filtering (Step S704). FIG. 10 is a graph for showing an example of frequency characteristics of a filter to be used in the filtering. The solid line in FIG. 10 represents an example of the frequency characteristics of the filter. The dashed-dotted line in FIG. 10 represents another example of the frequency characteristics of the filter. The lateral axis represents spatial frequency, and the vertical axis represents a filter coefficient.

When it is presumed that the focus detection is performed under a state in which the defocus amount is large, the filtering may be performed with use of a filter having a low frequency band in a passband. Therefore, in this case, the filter having the frequency characteristics as represented by the solid line in FIG. 10 can be used.

On the other hand, when the focus detection is enabled not only under a state in which the defocus amount is large but also under a state in which the defocus amount is small, it is preferred to use a filter having even a high frequency band in the passband. In this case, the filter having the frequency characteristics as represented by the dashed-dotted line in FIG. 10, that is, a filter having not only the low frequency band but also the high frequency band in the passband is preferred to be used.

In this way, the first focus detection signal and the second focus detection signal are subjected to filtering (Step S704).

Next, shifting is performed, which is processing of shifting the first focus detection signal and the second focus detection signal relatively in a pupil division direction, to thereby calculate the correlation amount representing the degree of matching of those signals (Step S705). Such shifting is performed with use of the first focus detection signal subjected to filtering and the second focus detection signal subjected to filtering.

When $s_1$ represents the shift amount by the shifting and $\Gamma 1$ represents a shift range of the shift amount $s_1$, a correlation amount COR representing the degree of matching between the first focus detection signal and the second focus detection signal is calculated by the following expression (1). In this case, A(k) represents the k-th signal in the first focus detection signal, and B(k) represents the k-th signal in the second focus detection signal. Symbol W represents the range of the number k corresponding to the focus detection region.

$$COR(s_1) = \sum_{k \in W} |A(k) - B(k - s_1)|, s_1 \in \Gamma 1 \qquad (1)$$

When the correlation amount COR is calculated, a second focus detection signal $B(k-s_1)$ that is the $(k-s_1)$th signal is subtracted from a first focus detection signal A(k) that is the k-th signal, to thereby generate a shift subtracting signal and obtain the absolute value of the shift subtracting signal. The value of the number k is sequentially changed within the range W corresponding to the focus detection region, and the sum of the absolute values of the shift subtracting signals is obtained, to thereby calculate a correlation amount $COR(s_1)$. As necessary, the correlation amount (evaluation value) calculated for each row may be added for a plurality of rows for each shift amount.

In this manner, the correlation amount representing the degree of matching between the first focus detection signal and the second focus detection signal is calculated for each shift amount $s_1$ (Step S705).

Next, defocus amount calculation processing is performed (Step S706). In the defocus amount calculation processing, first, based on the shift amount $s_1$ obtained when the correlation amount takes the minimum value, an image shift amount p1 is calculated. Then, the calculated image shift amount p1 is multiplied by the image height of the focus detection region, the F value of the photographing lens (imaging optical system) 105 and a conversion coefficient K corresponding to the exit pupil distance, to thereby calculate the defocus amount (detected defocus amount).

In this manner, the defocus amount is calculated by the phase-difference focus detection. As described above, the thus calculated defocus amount does not always completely match with the actual defocus amount (real defocus amount). Therefore, in this embodiment, as described later, the defocus amount calculated in the defocus amount calculation processing (Step S706) is subjected to correction processing (Step S2105).

[Point Image Intensity Distribution]

Generation of the point image intensity distribution schematically described with reference to FIG. 6 (Step S602) is described in detail below, but prior to the specific description of the generation of the point image intensity distribution, the point image intensity distribution is described below.

Figure 11A:
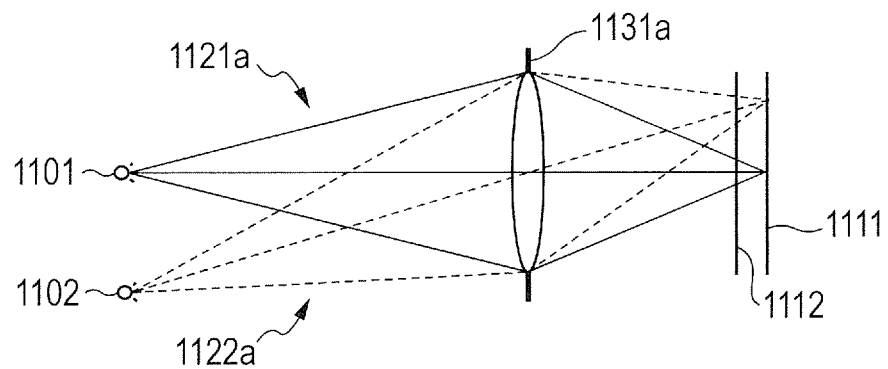
FIG. 11A, FIG. 11B, and FIG. 11C are diagrams for describing a point image intensity distribution.
Figure 11B:
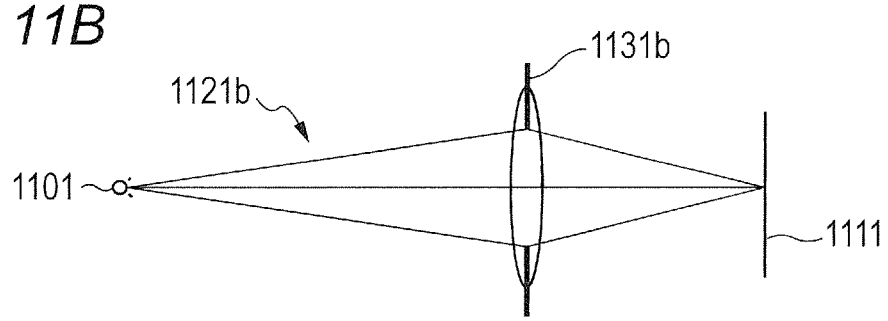
Figure 11C:
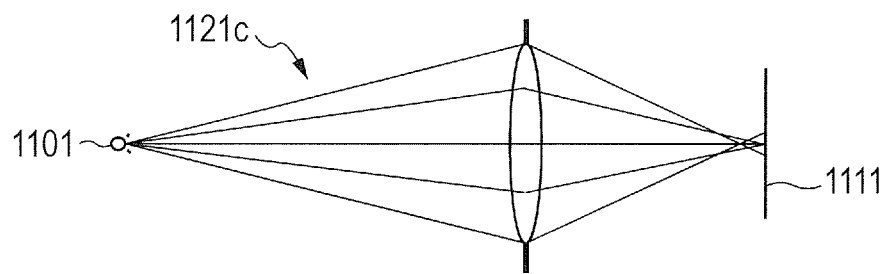

FIG. 11A to FIG. 11C are diagrams for describing the point image intensity distribution. FIG. 11A is a diagram for describing the difference in point image intensity distribution due to the difference in defocus amount, and for describing the difference in point image intensity distribution due to the difference in image height. FIG. 11B is a diagram for describing the difference in point image intensity distribution due to the difference in aperture value. FIG. 11C is a diagram for describing the difference in point image intensity distribution due to presence or absence of lens aberration.

FIG. 12A to FIG. 12E are diagrams for illustrating the point image intensity distributions. The lateral axis of FIG. 12A to FIG. 12E represents a position of the image pickup surface of the image pickup element 122 in the horizontal direction (X direction), and the vertical axis of FIG. 12A to FIG. 12E represents the light intensity.

FIG. 12A is the point image intensity distribution when light from a point light source 1101 at the center image height reaches the image pickup surface located at a position 1111. FIG. 12B is the point image intensity distribution when the light from the point light source 1101 at the center image height reaches the image pickup surface located at a position 1112. FIG. 12C is the point image intensity distribution when light from a point light source 1102 at a peripheral image height reaches the image pickup surface located at the position 1111. FIG. 12D is the point image intensity distribution when an aperture of a diaphragm 1131b is narrowed. FIG. 12E is the point image intensity distribution when lens aberration is present.

The point image intensity distribution represents a light intensity distribution when the light from the point light source is received on the light receiving surface (image pickup surface) of the image pickup element. As illustrated in FIG. 12A to FIG. 12E, the point image intensity distribution differs depending on the difference in defocus amount, the difference in image height, the difference in aperture value, and the difference in lens aberration.

The difference in point image intensity distribution due to the difference in defocus amount can be described with reference to FIG. 12A and FIG. 12B. FIG. 12A is an example in which the image pickup surface of the image pickup element 122 is located at the position 1111 at which the light flux from the point light source 1101 is imaged. FIG. 12B is an example in which the image pickup surface of the image pickup element 122 is located at the position 1112 on the front side of the position 1111 at which the light flux from the point light source 1101 is imaged. That is, FIG. 12A corresponds to a case where the defocus amount is 0, and FIG. 12B corresponds to a case where the defocus amount is not 0. As is understood through comparison between FIG. 12A and FIG. 12B, when the defocus amount differs, the spreading of the point image intensity distribution and the peak value of the point image intensity distribution differ.

As described above, the point image intensity distribution differs depending on the difference in defocus amount. In this embodiment, as described later, the point image intensity distribution is calculated with use of the lens light field data to be described later, which represents the information of the light flux in a vector form. Therefore, the point image intensity distribution that differs depending on the difference in defocus amount as described above can be calculated.

The difference in point image intensity distribution due to the difference in image height can be described with reference to FIG. 12A and FIG. 12C. FIG. 12A is an example of the case where the light flux from the point light source 1101 at the center image height is imaged on the image pickup surface of the image pickup element 122 located at the position 1111. FIG. 12C is an example of the case where the light flux from the point light source 1102 at the peripheral image height is imaged on the image pickup surface of the image pickup element 122 located at the position 1111. A light flux 1121a from the point light source 1101 at the center image height and a light flux 1122a from the point light source 1102 at the peripheral image height differ in incident angle to the photographing lens 105, and also differ in incident angle to the image pickup surface of the image pickup element 122. Therefore, as is understood through comparison between FIG. 12A and FIG. 12C, the difference in image height affects the symmetric property of the shape of the point image intensity distribution. That is, in FIG. 12A, the shape of the point image intensity distribution is bilaterally symmetric, but in FIG. 12C, the shape of the point image intensity distribution is not bilaterally symmetric and is biased.

As described above, the point image intensity distribution differs depending on the difference in image height. Therefore, the lens light field data to be described later is required to be held for each image height.

The difference in point image intensity distribution due to the difference in aperture value can be described with reference to FIG. 12A and FIG. 12D. FIG. 12A corresponds to FIG. 11A, and is an example of a case where an aperture of a diaphragm 1131a is relatively large. FIG. 12D corresponds to FIG. 11B, and is an example of a case where the aperture of the diaphragm 1131b is relatively small. The diaphragm 1131a and the diaphragm 1131b differ from each other in size of the aperture, and hence the diaphragms 1131a and 1131b differ from each other in width of the light fluxes passing therethrough. Therefore, there is a difference in range of the light fluxes reaching the image pickup surface of the image pickup element 122. As is understood through comparison between FIG. 12A and FIG. 12D, the difference in aperture value causes difference in spreading of the point image intensity distribution, and further causes difference in peak value of the point image intensity distribution. Note that, in this case, the influence of diffraction is not taken into consideration.

As described above, as the aperture value is reduced, the light flux 1121a is vignetted by the diaphragm 1131b, that is, vignetting occurs. Therefore, the range of the light fluxes reaching the image pickup surface of the image pickup element 122 is limited. Therefore, as described later, based on the vignetting information, part of the lens light field data is selectively used.

The difference in point image intensity distribution due to the difference in lens aberration can be described with reference to FIG. 12A and FIG. 12E. FIG. 12A corresponds to FIG. 11A, and is an example of a case where aberration is absent. FIG. 12E corresponds to FIG. 11C, and is an example of a case where aberration is present. The light flux 1121a illustrated in FIG. 11A and a light flux 1121c illustrated in FIG. 11C differ from each other in optical path after being refracted by the lens. When aberration is present, as illustrated in FIG. 11C, the light fluxes do not intersect at one point. As is understood through comparison between FIG. 12A and FIG. 12E, the difference in lens aberration causes the difference in point image intensity distribution. When aberration is present, the light fluxes do not intersect at one point. Therefore, in both cases of front focus and rear focus, the shape is not similar to the shape of the point image intensity distribution illustrated in FIG. 12A, which may cause offset at the time of focus detection. Note that, the offset is described in detail later.

As described above, the point image intensity distribution differs depending on the difference in defocus amount, image height, aperture value, aberration, and the like.

[Point Image Intensity Distribution Generation Processing]

Figure 13:
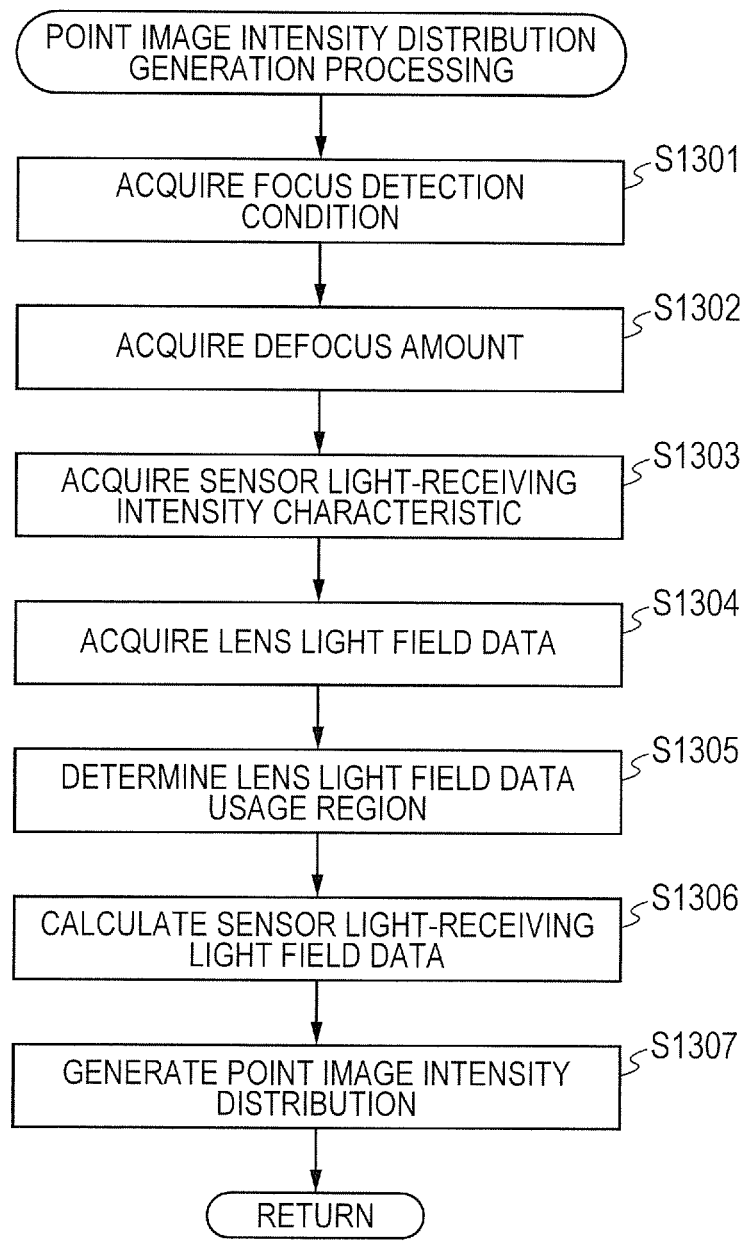
FIG. 13 is a flow chart for illustrating point image intensity distribution generation processing of the image pickup apparatus according to the first embodiment of the present invention.

Next, the point image intensity distribution generation processing is described with reference to FIG. 13. FIG. 13 is a flow chart for illustrating the point image intensity distribution generation processing in the image pickup apparatus according to this embodiment. FIG. 13 is a flow chart for describing details of the point image intensity distribution generation processing (Step S602) schematically described with reference to FIG. 6.

The point image intensity distribution generation processing illustrated in FIG. 13 is executed by the ROM 125a, the lens memory 118, the camera MPU 125, and the like in cooperation with each other. The ROM 125a functions as a sensor light-receiving intensity characteristic storage unit (sensor light-receiving intensity characteristic storage portion). The lens memory 118 functions as a lens light field data storage unit (lens light field data storage portion). The camera MPU 125 functions as the point image intensity distribution generating unit (point image intensity distribution generating portion).

First, a condition when the focus detection processing (Step S601) is performed, that is, a focus detection condition is acquired (Step S1301). The focus detection condition refers to information when the focus detection is performed, such as the image height, the aperture value, the lens zoom state, and the lens focus state.

Next, the defocus amount calculated in the defocus amount calculation processing (Step S706) is acquired (Step S1302).

Next, the sensor light-receiving intensity characteristic is acquired (Step S1303). The sensor light-receiving intensity characteristic is a characteristic specific to the image pickup element 122, and hence is stored in advance in the ROM 125a serving as the sensor light-receiving intensity characteristic storage unit. The sensor light-receiving intensity characteristic represents the light-receiving intensity of the light flux passing through each region of the entrance pupil of the microlens arranged on the image pickup element on the light receiving surface 304 of the image pickup element 122. In other words, the sensor light-receiving intensity characteristic represents a light-receiving intensity distribution of the light flux reaching each pixel of the image pickup element 122 on the light receiving surface 304 of the image pickup element 122. Note that, the sensor light-receiving intensity characteristic is described in detail later.

Next, the lens light field data is acquired (Step S1304). The lens light field data is data specific to the lens, and hence is stored in advance in the lens memory 118 serving as the lens light field data storage unit. The lens memory 118 stores various pieces of lens light field data corresponding to the focus detection condition and the defocus amount. Therefore, the lens light field data corresponding to the focus detection condition acquired in Step S1301 and the defocus amount acquired in Step S1302 is read out from the lens memory 118. The lens light field data includes information relating to directions of a plurality of light fluxes emitted from one point of the object position and passing through different regions of the exit pupil of the imaging optical system, and information relating to positions of points on the respective light fluxes. The lens light field data may further include information relating to the intensities of the light fluxes in addition to the information relating to the directions of the light fluxes and the information relating to the positions of the points on the light fluxes. Note that, in this case, the information relating to the intensities of the light fluxes refers to information taking a lens transmittance distribution into consideration. Further, the intensity of the light flux is represented by a length component of a vector. Therefore, the lens light field data including the information relating to the directions of the light fluxes, the positions of the points on the light fluxes, and the intensities of the light fluxes can also be represented by information relating to the starting points and the end points of the light fluxes. Note that, the lens light field data is described in detail later.

Next, from the lens light field data read out in Step S1304, a region to be used is determined (Step S1305). A lens light field data usage region is determined based on the focus detection condition acquired in Step S1301. Specifically, the lens light field data of a part vignetted by a vignetting frame 1505 is not used, and only the lens light field data of a part not vignetted by the vignetting frame 1505 is used. The lens light field data is stored as information of each region of the exit pupil, and hence such selection of only a partial region is possible. Note that, the vignetting frame 1505 is described in detail later.

Next, processing of calculating sensor light-receiving light field data is performed (Step S1306). In the sensor light-receiving light field data calculation processing, based on a sensor light-receiving intensity characteristic 1401 acquired in Step S1303 and the lens light field data whose usage region is determined in Step S1305, the sensor light-receiving light field data is calculated. Specifically, the sensor light-receiving light field data is calculated by a product of the intensities of the plurality of light fluxes represented by the lens light field data and the sensor light-receiving intensity characteristic in the region corresponding to the plurality of light fluxes.

Next, processing of generating the point image intensity distribution is performed (Step S1307). In the point image intensity distribution generation processing, based on the sensor light-receiving light field data calculated in Step S1306, a plurality of point image intensity distributions obtained when the position of the light receiving surface 304 of the image pickup element 122 is varied in the optical axis direction are generated.

Figure 14:
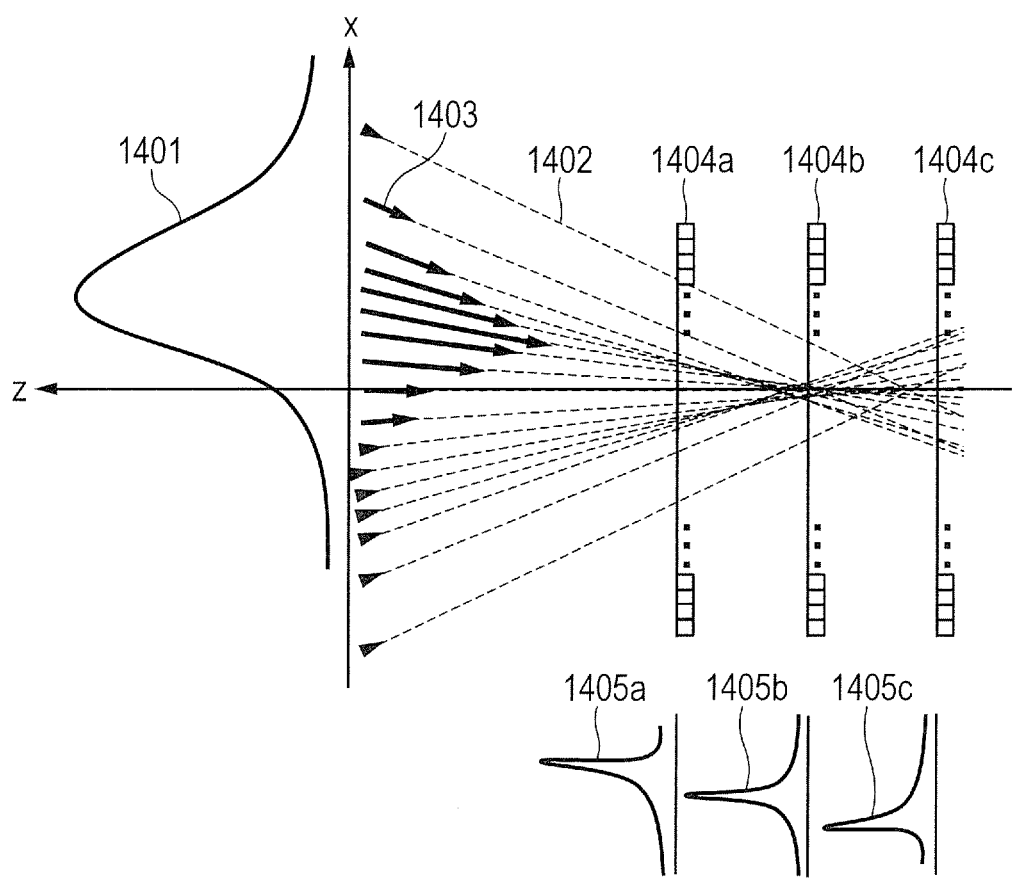
FIG. 14 is a diagram for illustrating a relationship among lens light field data, a sensor light-receiving intensity characteristic, and a point image intensity distribution.

FIG. 14 is a diagram for illustrating a relationship among the lens light field data, the sensor light-receiving intensity characteristic, and the point image intensity distribution. The X axis in FIG. 14 represents the horizontal direction of the exit pupil plane, and the Z axis in FIG. 14 represents the optical axis direction.

Reference symbol 1401 represents a distribution obtained when the sensor light-receiving intensity characteristic (sensor light-receiving intensity distribution) is projected on the exit pupil plane. Note that, the sensor light-receiving intensity characteristic represents, as described above, the intensity of each light flux reaching each pixel 200 on the light receiving surface 304 of the image pickup element 122, and does not represent the intensity of each light flux on the exit pupil plane. In FIG. 14, for the sake of easy understanding of the description, the sensor light-receiving intensity characteristic is projected on the exit pupil plane.

Reference symbol 1402 represents the lens light field data. Reference symbol 1403 represents the sensor light-receiving light field data. Reference symbols 1404a, 1404b, and 1404c represent positions of the image pickup element 122, that is, sensor positions. Reference symbols 1405a, 1405b, and 1405c represent the point image intensity distributions at the respective sensor positions 1404a, 1404b, and 1404c. Note that, those point image intensity distributions 1405a, 1405b, and 1405c are generated based on the sensor light-receiving light field data 1403.

The sensor light-receiving light field data 1403 is obtained by a product of the intensities of the plurality of light fluxes represented by the lens light field data 1402 and the sensor light-receiving intensity characteristic 1401 of the region corresponding to the plurality of light fluxes. At coordinates at which the intensity of the sensor light-receiving intensity characteristic 1401 is large, the sensor light-receiving light field data 1403 is large.

The point image intensity distribution 1405a is calculated by integrating the light-receiving intensities at the sensor position 1404a of the light fluxes in the sensor light-receiving light field data based on the reaching points at the sensor position 1404a of the light fluxes in the sensor light-receiving light field data 1403. The point image intensity distribution 1405b is calculated by integrating the light-receiving intensities at the sensor position 1404b of the light fluxes in the sensor light-receiving light field data based on the reaching points at the sensor position 1404b of the light fluxes in the sensor light-receiving light field data 1403. The point image intensity distribution 1405c is calculated by integrating the light-receiving intensities at the sensor position 1404c of the light fluxes in the sensor light-receiving light field data based on the reaching points at the sensor position 1404c of the light fluxes in the sensor light-receiving light field data 1403. At the time of integrating the light-receiving intensities of the light fluxes on the sensor light-receiving light field data 1403, the integration is performed at intervals (pitches) of the pixels 200 arranged in the image pickup element 122.

As described above, the sensor light-receiving light field data is calculated based on the product of the sensor light-receiving intensity characteristic and the lens light field data, and the point image intensity distributions at a plurality of defocus positions are generated based on the sensor light-receiving light field data.

[Sensor Light-Receiving Intensity Characteristic]

Next, the sensor light-receiving intensity characteristic is described.

Note that, as described above, the sensor light-receiving intensity characteristic is a characteristic specific to the image pickup element 122, and hence is stored in advance in, for example, the ROM 125a serving as the sensor light-receiving intensity characteristic storage unit.

FIG. 15A to FIG. 15F are schematic diagrams for illustrating the sensor light-receiving intensity characteristic. In FIG. 15A to FIG. 15F, the sensor light-receiving intensity characteristic is illustrated by being projected on the exit pupil plane. As described above, the sensor light-receiving intensity characteristic represents the intensity of each light flux reaching each pixel 200 on the light receiving surface 304 of the image pickup element 122, and does not represent the distribution of the intensity of the light flux on the exit pupil plane. In this case, for the sake of easy understanding of the description, the sensor light-receiving intensity characteristic is illustrated by being projected on the exit pupil plane.

Figure 15A:
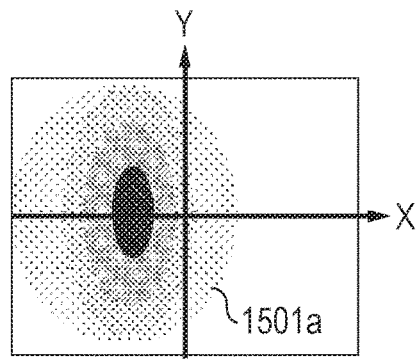
FIG. 15A, FIG. 15B, FIG. 15C, FIG. 15D, FIG. 15E, and FIG. 15F are schematic diagrams for illustrating the sensor light-receiving intensity characteristic.

FIG. 15A is a two-dimensional illustration of a sensor light-receiving intensity characteristic 1501a of the light fluxes passing through the first pupil partial region 501, and represents a case where vignetting does not occur. FIG. 15B is a two-dimensional illustration of a sensor light-receiving intensity characteristic 1501b of the light fluxes passing through the second pupil partial region 502, and represents a case where vignetting does not occur. FIG. 15C is a one-dimensional illustration of sensor light-receiving intensity characteristics, and represents a case where vignetting does not occur. Reference symbol 1502a represents the sensor light-receiving intensity characteristic of the light fluxes passing through the first pupil partial region 501, and reference symbol 1502b represents the sensor light-receiving intensity characteristic of the light fluxes passing through the second pupil partial region 502.

Figure 15D:
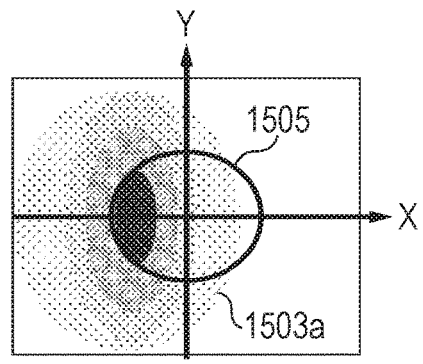
Figure 15B:
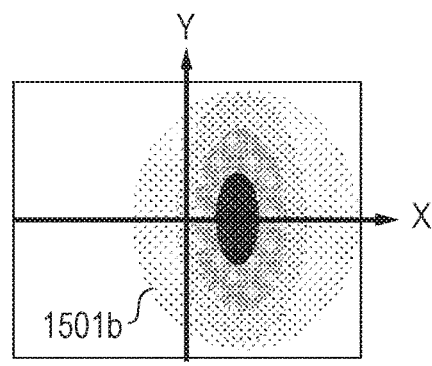
Figure 15E:
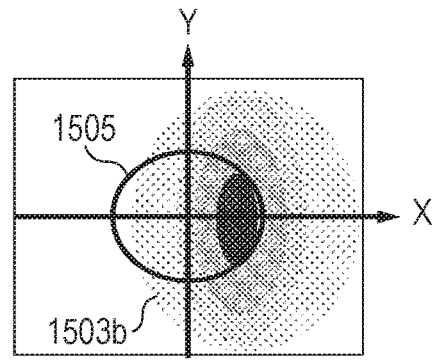
Figure 15C:
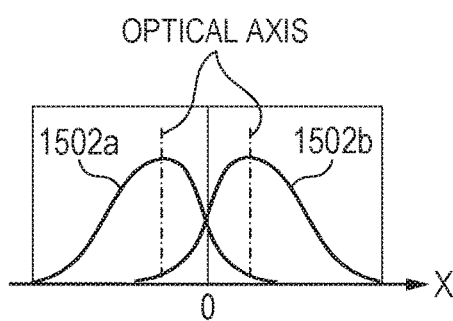
Figure 15F:
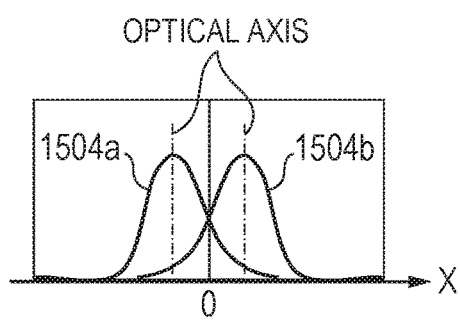

FIG. 15D is a two-dimensional illustration of a sensor light-receiving intensity characteristic 1503a of the light fluxes passing through the first pupil partial region 501, and represents a case where vignetting occurs. FIG. 15E is a two-dimensional illustration of a sensor light-receiving intensity characteristic 1503b of the light fluxes passing through the second pupil partial region 502, and represents a case where vignetting occurs. FIG. 15F is a one-dimensional illustration of sensor light-receiving intensity characteristics, and represents a case where vignetting occurs.

The X axis and the Y axis of FIG. 15A, FIG. 15B, FIG. 15D, and FIG. 15E represent coordinates on the exit pupil plane. FIG. 15A, FIG. 15B, FIG. 15D, and FIG. 15E represent the intensity of the light by the density of the dots. Denser dots represent higher light intensity, and sparser dots represent lower light intensity. Reference symbol 1505 in FIG. 15D and FIG. 15E represents the vignetting frame. The vignetting frame refers to a boundary of vignetting by a lens frame and a diaphragm frame, and is held as vignetting information. The X axis of FIG. 15C and FIG. 15F represents the horizontal direction of the exit pupil plane.

When the vignetting does not occur, the sensor light-receiving intensity characteristics illustrated one-dimensionally have distributions as reference symbols 1502a and 1502b of FIG. 15C.

In contrast, when the vignetting occurs, the sensor light-receiving intensity characteristics illustrated one-dimensionally have distributions as reference symbols 1504a and 1504b of FIG. 15F.

As described above, the sensor light-receiving intensity characteristic is dependent on the vignetting frame 1505 and the pupil shape.

Note that, in this case, the sensor light-receiving intensity characteristic at the center image height is described as an example, but the sensor light-receiving intensity characteristic at the peripheral image height is similar to the above. Note that, at the peripheral image height, the vignetting frame 1505 may not have a circular shape.

As described above, the sensor light-receiving intensity characteristic represents the intensity of each light flux reaching each pixel 200 on the light receiving surface 304 of the image pickup element 122. However, when the lens light field data is defined by the coordinates on the exit pupil plane, it is preferred that the sensor light-receiving intensity characteristic be also defined by the coordinates on the exit pupil plane. This is because, by defining the lens light field data and the sensor light-receiving intensity characteristic by coordinates on the same plane, the calculation of the sensor light-receiving light field data is facilitated. In this case, the lens light field data is defined on the exit pupil plane, and the sensor light-receiving intensity characteristic is also defined by coordinates obtained when the sensor light-receiving intensity characteristic is projected on the exit pupil plane.

The sensor light-receiving intensity characteristic is data representing the two-dimensional distribution of the intensity of the light flux reaching each pixel 200 on the light receiving surface 304 of the image pickup element 122, and is held correspondingly to XY coordinates obtained when the sensor light-receiving intensity characteristic is projected on the exit pupil plane.

Note that, the lens light field data may be defined by coordinates on a plane different from the exit pupil plane. In this case, the sensor light-receiving intensity characteristic is held correspondingly to XY coordinates obtained when the sensor light-receiving intensity characteristic is projected on the same plane as the plane on which the lens light field data is defined.

Figure 16:
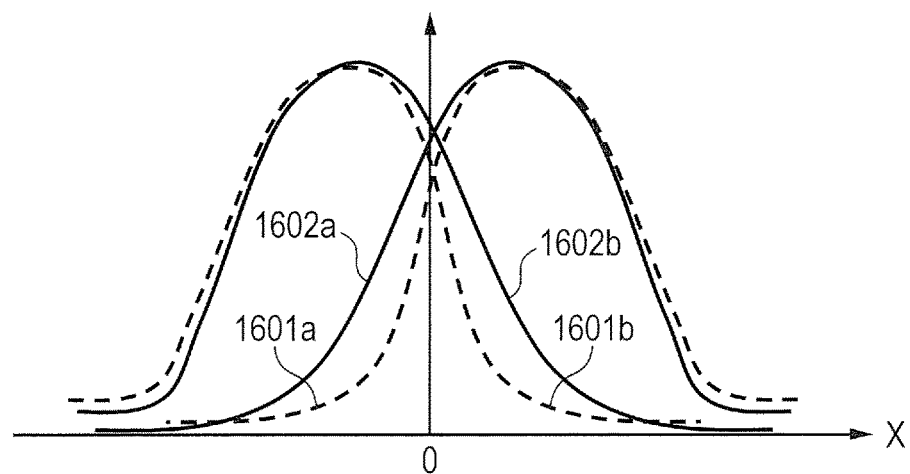
FIG. 16 is a graph for showing difference in sensor light-receiving intensity characteristic due to difference in type of the image pickup element.

The difference in sensor light-receiving intensity characteristic is caused also depending on the difference in type (model, kind) of the image pickup element 122. FIG. 16 is a graph for showing the difference in sensor light-receiving intensity characteristic due to the difference in type of the image pickup element. The lateral axis X represents the horizontal direction of the exit pupil plane, and the vertical axis represents the light-receiving intensity.

Reference symbol 1601a one-dimensionally represents a sensor light-receiving intensity characteristic of a case where the light fluxes passing through the first pupil partial region 501 are received by a first image pickup element (not shown). Reference symbol 1601b one-dimensionally represents a sensor light-receiving intensity characteristic of a case where the light fluxes passing through the second pupil partial region 502 are received by the first image pickup element.

Reference symbol 1602a one-dimensionally represents a sensor light-receiving intensity characteristic of a case where the light fluxes passing through the first pupil partial region 501 are received by a second image pickup element (not shown) of a type different from that of the first image pickup element. Reference symbol 1602b one-dimensionally represents a sensor light-receiving intensity characteristic of a case where the light fluxes passing through the second pupil partial region 502 are received by the second image pickup element.

The sensor light-receiving intensity characteristic 1601a of the first image pickup element is remarkably lower than the sensor light-receiving intensity characteristic 1602a of the second image pickup element in a region having a negative X coordinate value.

Further, the sensor light-receiving intensity characteristic 1601b of the first image pickup element is remarkably lower than the sensor light-receiving intensity characteristic 1602b of the second image pickup element in a region having a positive X coordinate value.

The difference in sensor light-receiving intensity characteristic is caused depending on the type of the image pickup element because the vignetting due to, for example, a multi-layer wiring structure arranged above the light receiving surface 304 of the image pickup element 122 differs depending on the type of the image pickup element.

The difference in sensor light-receiving intensity characteristic is caused also due to, for example, misalignment caused when the image pickup element 122 is mounted to the image pickup apparatus main body 120. That is, when the image pickup element 122 is mounted to the image pickup apparatus main body 120, the light receiving surface 304 of the image pickup element 122 may be tilted with respect to the entrance pupil plane. The distance from the light receiving surface 304 of the image pickup element 122 to the exit pupil plane (pupil distance) is several tens of millimeters. Therefore, when the light receiving surface 304 of the image pickup element 122 is tilted by several degrees with respect to the exit pupil plane, the optical axis is misaligned at a level of several millimeters on the exit pupil plane. The pixel pitch of the image pickup element 122 is generally several micrometers, and hence the misalignment of the optical axis at the level of several millimeters cannot be ignored.

Figure 17A:
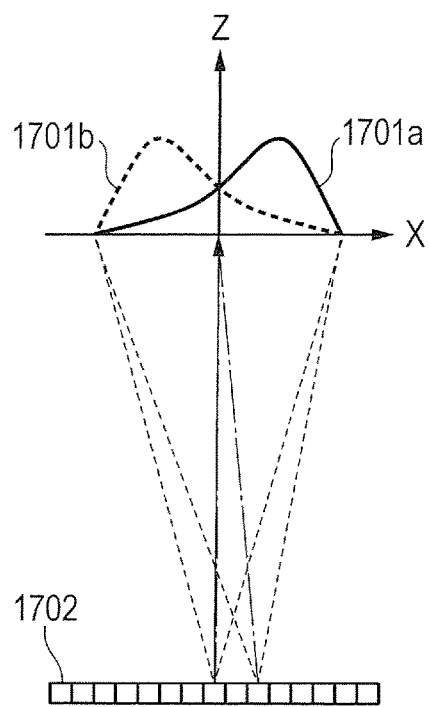
FIG. 17A and FIG. 17B are schematic diagrams for illustrating influences on the sensor light-receiving intensity characteristic due to misalignment caused when the image pickup element is mounted.
Figure 17B:
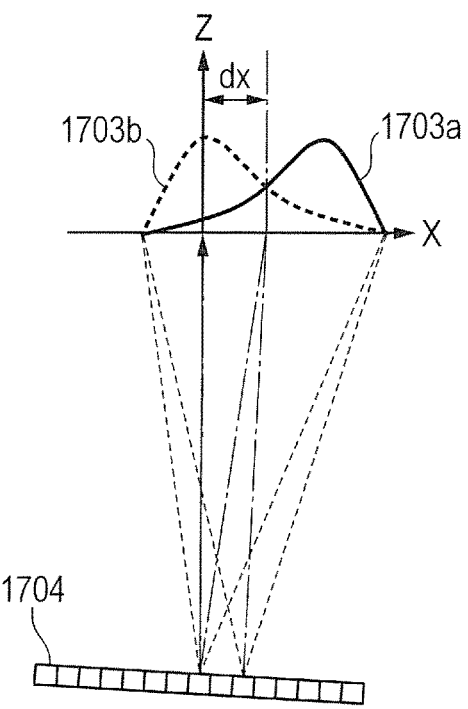

FIG. 17A and FIG. 17B are schematic diagrams for illustrating influences on the sensor light-receiving intensity characteristic due to the misalignment caused when the image pickup element is mounted. FIG. 17A is an example of a case where the image pickup element 122 is normally mounted to the image pickup apparatus main body 120. FIG. 17B is an example of a case where the image pickup element 122 is mounted to the image pickup apparatus main body 120 in a tilted manner. The X axis represents the horizontal direction of the image pickup element 122, and the Z axis represents the optical axis direction.

The diagram in the upper part of FIG. 17A and the diagram in the upper part of FIG. 17B represent distributions when the sensor light-receiving intensity characteristics are projected on the exit pupil plane. Reference symbols 1701a and 1703a one-dimensionally represent sensor light-receiving intensity characteristics of the light fluxes passing through the first pupil partial region 501. Further, reference symbols 1701b and 1703b one-dimensionally represent sensor light-receiving intensity characteristics of the light fluxes passing through the second pupil partial region 502. Reference symbol 1702 represents the image pickup element 122 mounted parallel to the exit pupil plane, and reference symbol 1704 represents the image pickup element 122 mounted in a tilted manner with respect to the exit pupil plane.

Symbol dx of FIG. 17B represents a misalignment amount of the optical axis, which differs depending on the tilting angle of the light receiving surface 304 of the image pickup element 122 with respect to the exit pupil plane.

Note that, in this case, the misalignment in the X direction is described as an example, but the same holds true also in the misalignment in the Y direction.

As described above, the sensor light-receiving intensity characteristic differs also depending on the difference in type of the image pickup element 122 or misalignment caused when the image pickup element 122 is mounted to the image pickup apparatus main body 120. In this embodiment, the point image intensity distributions are generated with use of information taking such differences into consideration, and hence satisfactory point image intensity distributions can be generated. Therefore, according to this embodiment, the correction value to be used for correction in defocus amount correction to be described later can be calculated at high accuracy.

[Lens Light Field Data]

Next, the lens light field data is described in detail.

The lens light field data includes information relating to directions of a plurality of light fluxes emitted from one point of the object position and passing through different regions of the exit pupil of the imaging optical system, and information relating to positions of points on the light fluxes. The lens light field data may further include information relating to intensities of the light fluxes in addition to the information relating to the directions of the light fluxes and the information relating to the positions of the points on the light fluxes.

The intensity of the light flux may be represented by a length component of a vector, and hence the lens light field data including information relating to the directions of the light fluxes, the positions of the points on the light fluxes, and the intensities of the light fluxes can be also represented by information relating to the starting points and the end points of the light fluxes.

The lens light field data may be represented by six-dimensional information at the maximum, which is obtained by adding, for example, three-dimensional information representing the position of the point on the light flux, two-dimensional information representing the direction of the light flux, and one-dimensional information representing the intensity of the light flux.

As described above, the lens light field data does not represent information of the light flux by information representing refraction at each lens surface as in a ray tracing diagram, but represents information of the light flux through processing into information representing the direction of the light flux and the position of the point on the light flux. The lens light field data is represented by such information, and hence has a small data amount and is easy to handle when the point image intensity distribution is generated.

Figure 18A:
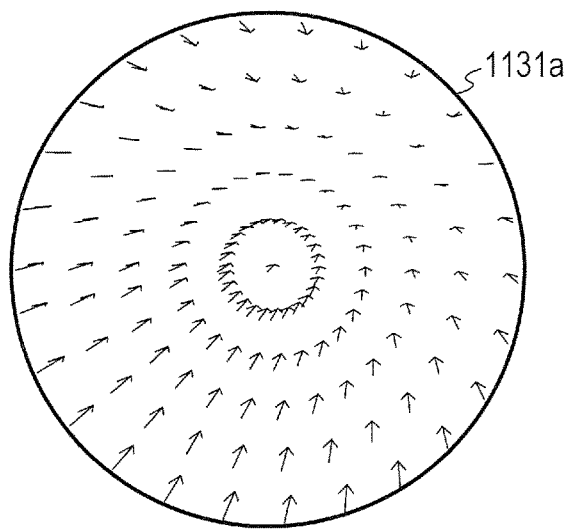
FIG. 18A, FIG. 18B, and FIG. 18C are schematic diagrams for two-dimensionally illustrating the lens light field data.
Figure 18B:
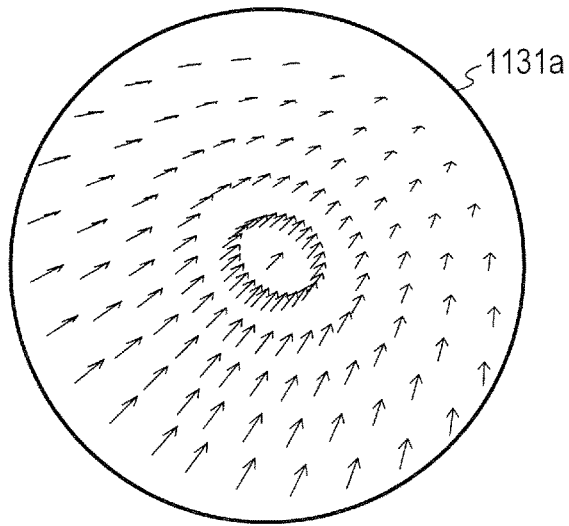
Figure 18C:
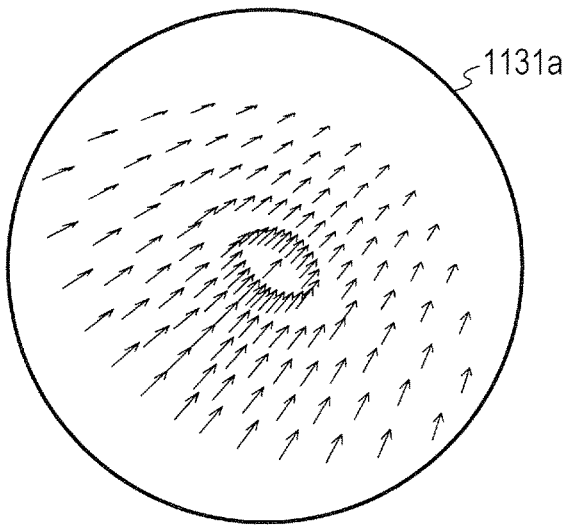

FIG. 18A to FIG. 18C are schematic diagrams for two-dimensionally illustrating the lens light field data. FIG. 18A is the lens light field data at the center image height, and FIG. 18B is the lens light field data at the peripheral image height of 80%. FIG. 18C is the lens light field data at the peripheral image height of 100%. All of FIG. 18A to FIG. 18C are the lens light field data associated with the exit pupil plane. Note that, the lens light field data is not limited to be associated with the exit pupil plane, and may be associated with a plane different from the exit pupil plane.

As illustrated in FIG. 18A, in the case of the center image height, the region of the lens light field data is determined based on only the vignetting by the diaphragm 1131a.

On the other hand, as illustrated in FIG. 18B, at the peripheral image height of 80%, vignetting occurs not only by the diaphragm 1131a but also by the lens frame. Therefore, with the vignetting frame obtained by combining the diaphragm 1131a and the lens frame, a region that may define the lens light field data is determined. The region that may define the lens light field data in the case of the peripheral image height of 80% is narrower than the region that may define the lens light field data in the case of the center image height.

As the image height is increased, the vignetted region is increased. Therefore, in the case of the peripheral image height of 100%, as illustrated in FIG. 18C, the region that may define the lens light field data is further narrowed.

Further, the vignetting frame changes depending on the aperture value, and hence the region of the lens light field data also differs depending on the aperture value.

As described above, the region that may define the lens light field data is determined based on the vignetting frame (vignetting information) that differs depending on the aperture value and the image height. Therefore, when the usage region is determined from the lens light field data (Step S1305 of FIG. 13), the usage region of the lens light field data is determined based on the focus detection condition such as the aperture value and the image height.

Figure 19A:
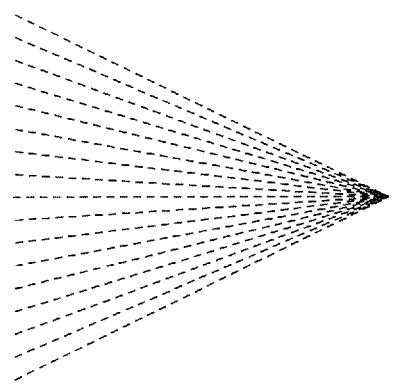
FIG. 19A and FIG. 19B are schematic diagrams for illustrating a relationship between presence or absence of aberration and collection of light fluxes.
Figure 19B:
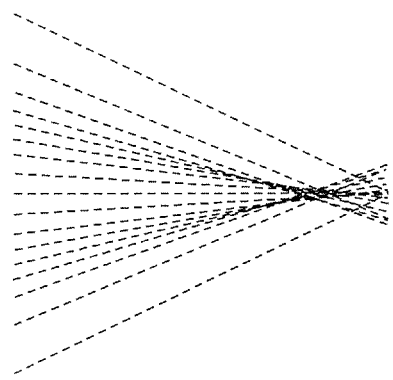

FIG. 19A and FIG. 19B are schematic diagrams for illustrating a relationship between presence or absence of aberration and collection of light fluxes. FIG. 19A is an illustration of a state of the collection of the light fluxes when the aberration is absent, and FIG. 19B is an illustration of a state of the collection of the light fluxes when the aberration is present.

When the aberration is absent, as illustrated in FIG. 19A, the light fluxes intersect at one point.

On the other hand, when the aberration is present, as illustrated in FIG. 19B, the light fluxes do not intersect at one point. In the actual imaging optical system 133, aberration is present, and hence the light fluxes are collected as illustrated in FIG. 19B, for example.

The lens light field data can be expressed in consideration of the influence of aberration in the imaging optical system 133. The aberration in the imaging optical system 133 differs depending on the type (model) of the imaging optical system (lens) 133, the manufacturing variations of the imaging optical system 133, and the like. The influence of the aberration is taken into consideration in the lens light field data, and hence the point image intensity distribution can be generated in consideration of the lens aberration.

Figure 20A:
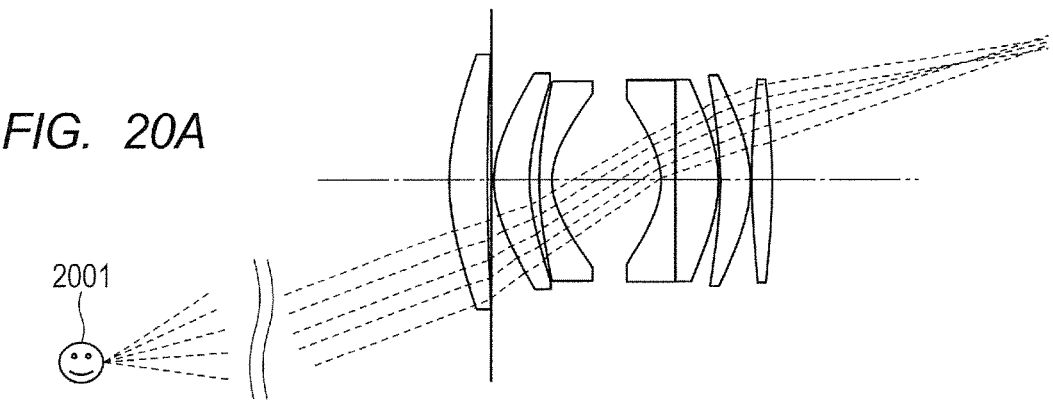
FIG. 20A, FIG. 20B, and FIG. 20C are schematic diagrams for illustrating a method of forming the lens light field data.
Figure 20B:
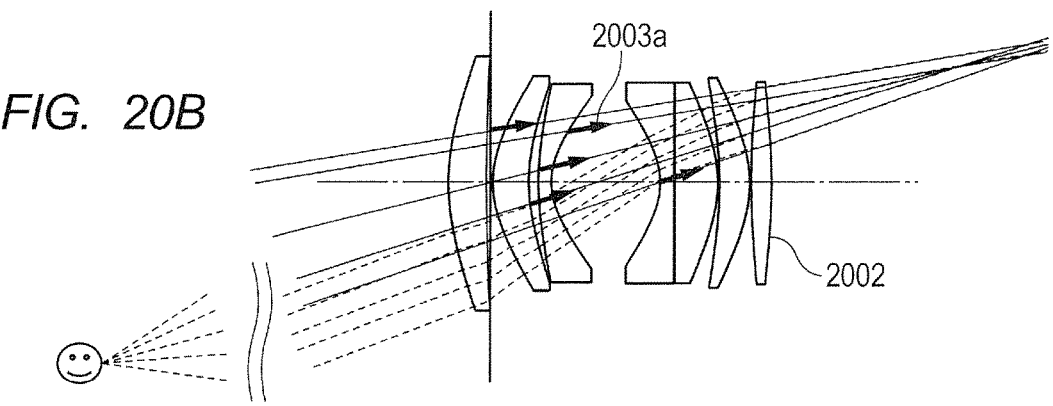
Figure 20C:
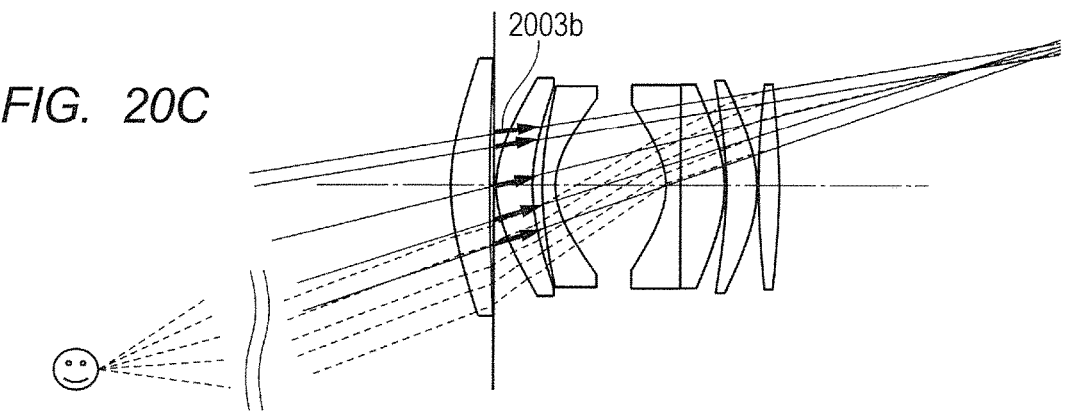

FIG. 20A to FIG. 20C are schematic diagrams for illustrating a method of forming the lens light field data.

FIG. 20A is a ray tracing diagram of the light fluxes from an object 2001. The ray tracing diagram of FIG. 20A includes information of refraction at each lens surface of each light beam from the object 2001.

FIG. 20B is an example of the lens light field data. As illustrated in FIG. 20B, the straight line including the trajectory of the light flux exiting from a rear lens 2002 is extended in a direction opposite to the traveling direction of the light flux, and on the extended line, the information of the coordinates of the starting point, the information of the direction, and the information of the intensity are defined, to thereby obtain the lens light field data. The lens light field data is held in a form of a vector, for example. Reference symbol 2003a in FIG. 20B represents a vector group forming the lens light field data.

FIG. 20C is an example of the lens light field data in a case where the starting point coordinates are aligned on the exit pupil plane. In FIG. 20C, the coordinates of the starting points of a vector group 2003b forming the lens light field data are set on the exit pupil plane. In the case as in FIG. 20C, the data amount of the lens light field data can be reduced to three-dimensional information including two-dimensional information relating to the direction of the light flux and one-dimensional information relating to the intensity of the light flux. Further, when the intensity of the light flux is not taken into consideration, the data amount of the lens light field data can be reduced to the two-dimensional information relating to the direction of the light flux.

Note that, in FIG. 20C, the coordinates of the starting points of the vector group forming the lens light field data are aligned on the exit pupil plane, but the coordinates are not limited to be aligned on the exit pupil plane. The coordinates of the starting points of the vectors can be aligned on an arbitrary plane.

In this embodiment, positional information defined in advance between the photographing lens 105 and the image pickup apparatus main body 120 is used as information of the positions of the starting points of the vector group 2003b forming the lens light field data. Therefore, even when the combination between the photographing lens 105 and the image pickup apparatus main body 120 is changed, the point image intensity distribution can be generated by common processing, thereby being capable of facilitating data processing.

The difference in type (model) and the manufacturing variations of the photographing lens 105 cause the difference in direction of the light flux traveling through the photographing lens 105, for example. In this embodiment, the point image intensity distribution is generated with use of the lens light field data specific to the photographing lens 105 to be used, and hence a satisfactory point image intensity distribution can be generated in consideration of such differences. Therefore, according to this embodiment, the correction value to be used in the defocus amount correction to be described later can be calculated at high accuracy.

[Defocus Amount Correction Processing]

Figure 21:
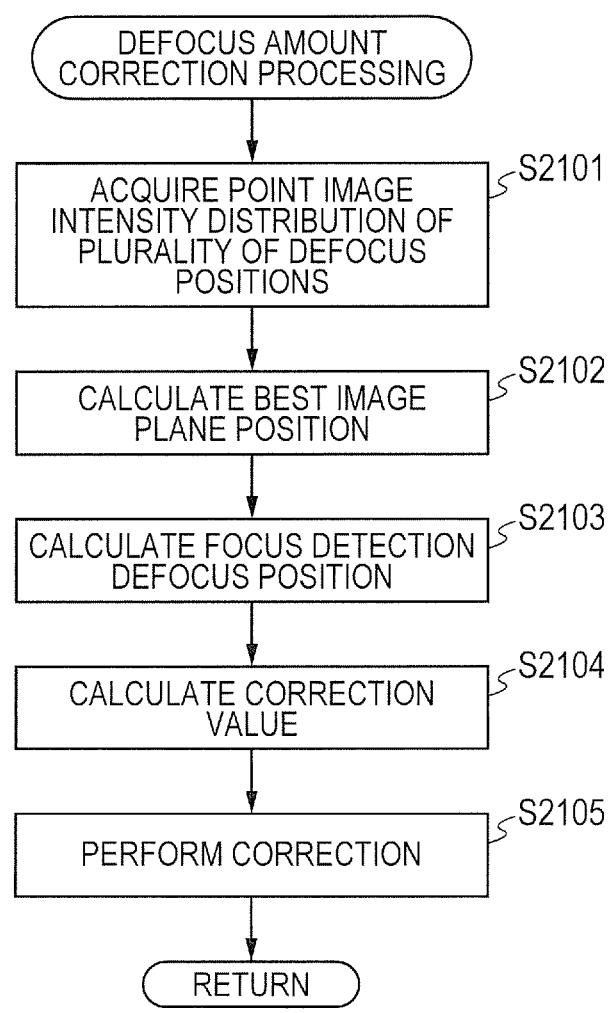
FIG. 21 is a flow chart for illustrating defocus amount correction processing of the image pickup apparatus according to the first embodiment of the present invention.

Next, the defocus amount correction processing is described. FIG. 21 is a flow chart for illustrating the defocus amount correction processing of the image pickup apparatus according to this embodiment. FIG. 21 is a flow chart for describing details of the defocus amount correction processing (Step S603) schematically described with reference to FIG. 6.

The defocus amount correction processing illustrated in FIG. 21 is executed by the ROM 125a, the lens memory 118, the camera MPU 125, and the like in cooperation with each other. The ROM 125a functions as the sensor light-receiving intensity characteristic storage unit (sensor light-receiving intensity characteristic storage portion). The lens memory 118 functions as the lens light field data storage unit (lens light field data storage portion). The camera MPU 125 functions as the point image intensity distribution generating unit (point image intensity distribution generating portion) configured to generate the point image intensity distribution and a correction value calculating unit (correction value calculating portion) configured to calculate the correction value.

First, point image intensity distributions of a plurality of defocus positions are acquired (Step S2101). Specifically, for example, the point image intensity distribution of a case where the position of the image pickup element 122 (sensor position) is located at a first position 2404 (see FIG. 24F) is acquired. Further, the point image intensity distribution of a case where the position of the image pickup element 122 is located at a second position 2405 (see FIG. 24F) is acquired. Further, the point image intensity distribution of a case where the position of the image pickup element 122 is located at a third position 2406 (see FIG. 24F) is acquired.

When the point image intensity distributions of the respective sensor positions 2404, 2405, and 2406 are acquired, the following point image intensity distributions are acquired. That is, the point image intensity distribution of the light fluxes passing through the first pupil partial region 501 and reaching the first divided pixel 201 is acquired. Further, the point image intensity distribution of the light fluxes passing through the second pupil partial region 502 and reaching the second divided pixel 202 is acquired. Further, the point image intensity distribution of the light fluxes passing through the pupil region 500 including the first pupil partial region 501 and the second pupil partial region 502 and reaching the image pickup pixel 200 including the first divided pixel 201 and the second divided pixel 202 is acquired.

The point image intensity distribution of the light fluxes passing through the first pupil partial region 501 and reaching the first divided pixel 201 and the point image intensity distribution of the light fluxes passing through the second pupil partial region 502 and reaching the second divided pixel 202 are, for example, as illustrated in FIG. 24H to FIG. 24J. FIG. 24H is the point image intensity distribution of the case where the image pickup element 122 is located at the first position 2404. FIG. 24I is the point image intensity distribution of the case where the image pickup element 122 is located at the second position 2405. FIG. 24J is the point image intensity distribution of the case where the image pickup element 122 is located at the third position 2406. The X axis represents the horizontal direction of the image pickup element 122, and the vertical axis represents the light-receiving intensity. Note that, in FIG. 24H to FIG. 24J, the point image intensity distributions in the horizontal direction of the image pickup element 122 are illustrated as an example.

Figure 22A:
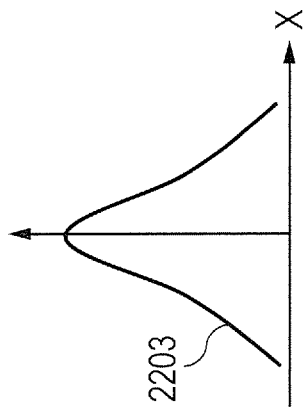
FIG. 22A, FIG. 22B, and FIG. 22C are schematic diagrams for illustrating the point image intensity distributions.
Figure 22B:
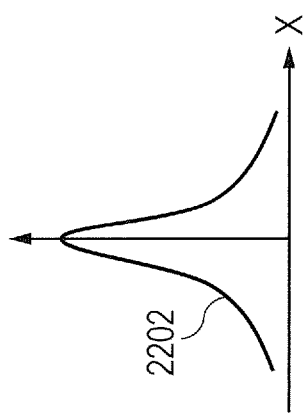
Figure 22C:
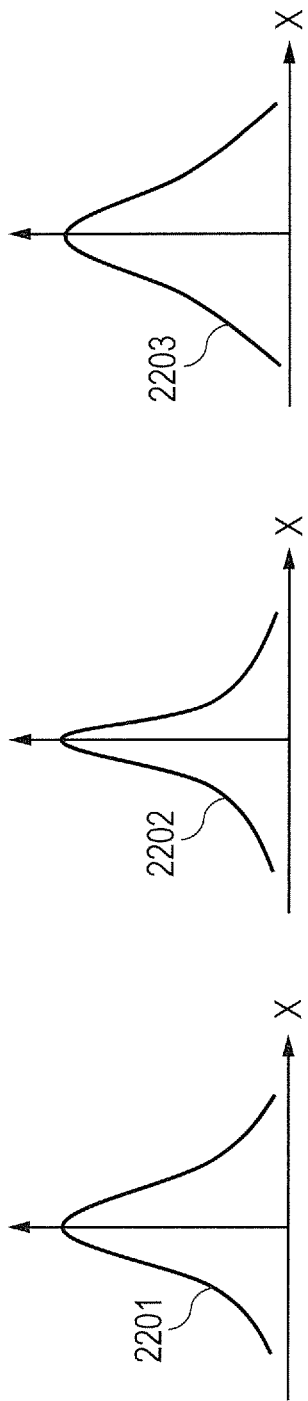

The point image intensity distribution of the light fluxes passing through the pupil region 500 including the first pupil partial region 501 and the second pupil partial region 502 and reaching the image pickup pixel 200 including the first divided pixel 201 and the second divided pixel 202 is, for example, as illustrated in FIG. 22A to FIG. 22C.

FIG. 22A to FIG. 22C are schematic diagrams for illustrating the point image intensity distributions. FIG. 22A is the point image intensity distribution of the case where the image pickup element 122 is located at the first position 2404. FIG. 22B is the point image intensity distribution of the case where the image pickup element 122 is located at the second position 2405. FIG. 22C is the point image intensity distribution of the case where the image pickup element 122 is located at the third position 2406. The X axis represents the horizontal direction of the image pickup element 122, and the vertical axis represents the light-receiving intensity. Note that, in FIG. 22A to FIG. 22C, the point image intensity distributions in the horizontal direction of the image pickup element 122 are illustrated as an example.

In this manner, the point image intensity distribution of the plurality of defocus positions are acquired (Step S2101).

Next, a best image plane position is calculated (Step S2102). The best image plane position (first in-focus position) is determined based on a contrast evaluation value calculated based on point image intensity distributions 2201, 2202, and 2203 of the plurality of defocus positions.

Figure 23:
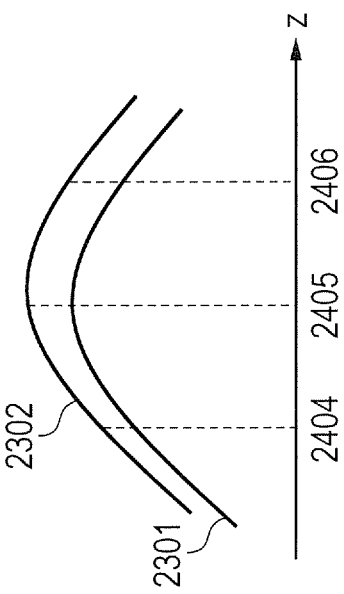
FIG. 23 is a schematic diagram for illustrating contrast evaluation values.

FIG. 23 is a schematic diagram for illustrating the contrast evaluation values. The lateral axis represents the position of the image pickup element 122 in the Z axis direction, that is, the sensor position, and the vertical axis represents the contrast evaluation value. FIG. 23 is obtained by plotting the contrast evaluation values calculated based on the point image intensity distributions 2201, 2202, and 2203 of the respective sensor positions 2404, 2405, and 2406. Reference symbol 2301 represents a contrast evaluation value based on the point image intensity distributions 2201, 2202, and 2203 in the horizontal direction of the image pickup element 122. That is, reference symbol 2301 represents a contrast evaluation value of a horizontal component. Reference symbol 2302 represents a contrast evaluation value based on the point image intensity distributions in the vertical direction of the image pickup element 122. That is, reference symbol 2302 represents a contrast evaluation value of a vertical component.

The sensor position obtained when the contrast evaluation value 2301 of the horizontal component takes a peak value is calculated as the best image plane position based on the horizontal component. Further, the sensor position obtained when the contrast evaluation value 2302 of the vertical component takes a peak value is calculated as the best image plane position based on the vertical component. In order to calculate the best image plane position for the object at high accuracy, the best image plane position is calculated based on a vertical and lateral component ratio of the object. The vertical and lateral component ratio of the object is calculated based on a ratio between the peak value of the contrast evaluation value of the vertical component of the image pickup signal and the peak value of the contrast evaluation value of the horizontal component of the image pickup signal. Based on the vertical and lateral component ratio of the object thus calculated, the best image plane position based on the horizontal component and the best image plane position based on the vertical component are weighted, to thereby calculate the best image plane position.

In order to calculate the best image plane position with respect to the object at high accuracy, the frequency band used when the contrast evaluation value is calculated is selected based on the frequency characteristics of the image pickup signal. Specifically, the contrast evaluation value of the image pickup signal obtained when the filtering is performed with use of a high pass filter is compared with the contrast evaluation value of the image pickup signal obtained when the filtering is performed with use of a low pass filter. When the contrast evaluation value is larger in the case where the high pass filter is used than in the case where the low pass filter is used, the frequency band included in a large amount in the object is considered to be a high band. In this case, the high band is selected as the frequency band used when the contrast evaluation value of the point image intensity distribution is calculated. On the other hand, when the contrast evaluation value is larger in the case where the low pass filter is used than in the case where the high pass filter is used, the frequency band included in a large amount in the object is considered to be a low band. In this case, the low band is selected as the frequency band used when the contrast evaluation value of the point image intensity distribution is calculated.

In this manner, the best image plane position (first in-focus position) is calculated (Step S2102).

Next, a focus detection defocus position (second in-focus position) is calculated (Step S2103). Specifically, the focus detection defocus position is calculated by performing correlation computing with use of point image intensity distributions $2424a$, $2424b$, $2425a$, $2425b$, $2426a$, and $2426b$ as illustrated in FIG. 24H to FIG. 24J.

Note that, the correlation computing may be performed with use of a signal obtained by convolution of the signal of the object and the point image intensity distribution, to thereby calculate the focus detection defocus position.

Further, in this case, the focus detection defocus position is calculated by performing correlation computing, but the focus detection defocus position is not limited to be calculated by performing correlation computing. The focus detection defocus position may be obtained by other method such as a contrast detection method.

In this manner, the focus detection defocus position (second in-focus position) is calculated (Step S2103).

Next, the correction value is calculated (Step S2104). This correction value refers to a difference between the best image plane position (first in-focus position) calculated in Step S2102 and the focus detection defocus position (second in-focus position) calculated in Step S2103. With use of this correction value, a defocus offset to be described later can be corrected. Note that, the defocus offset is described in detail later. The calculated correction value is recorded in, for example, the EEPROM 125c or the lens memory 118.

Next, the defocus amount is corrected with use of the calculated correction value (Step S2105). That is, with use of the correction value calculated in Step S2104, the defocus amount calculated in Step S706 of FIG. 7 is corrected.

In this manner, the defocus amount correction processing is ended.

[Defocus Offset Generation Principle]

Next, a defocus offset generation principle is described. FIG. 24A to FIG. 24J are schematic diagrams for illustrating the defocus offset generation principle.

FIG. 24A to FIG. 24E are illustrations of a case where the lens aberration is absent, and FIG. 24F to FIG. 24J are illustrations of a case where the lens aberration is present. The X axis of FIG. 24A and FIG. 24F represents the horizontal direction of the exit pupil plane. Reference symbols 2401 to 2406 represent positions of the image pickup element 122. Reference symbols 2401 and 2404 correspond to rear focus positions, reference symbols 2402 and 2405 correspond to best image plane positions, and reference symbols 2403 and 2406 correspond to front focus positions.

FIG. 24B and FIG. 24G are illustrations of defocus curves $2411a$ and $2411b$. The lateral axis of FIG. 24B and FIG. 24G represents the Z axis direction, that is, the optical axis direction, and the vertical axis of FIG. 24B and FIG. 24G represents the defocus amount def.

FIG. 24C to FIG. 24E and FIG. 24H to FIG. 24J are illustrations of the point image intensity distributions. The lateral axis represents the X axis direction, that is, the horizontal direction of the image pickup element 122, and the vertical axis represents the light-receiving intensity.

FIG. 24C is an illustration of point image intensity distributions $2421a$ and $2421b$ at the rear focus position 2401. Reference symbol $2421a$ represents the point image intensity distribution of the light fluxes passing through the first pupil partial region 501, and reference symbol $2421b$ represents the point image intensity distribution of the light fluxes passing through the second pupil partial region 502.

FIG. 24D is an illustration of the point image intensity distributions $2422a$ and $2422b$ at the best image plane position 2402. Reference symbol $2422a$ represents the point image intensity distribution of the light fluxes passing through the first pupil partial region 501, and reference symbol $2422b$ represents the point image intensity distribution of the light fluxes passing through the second pupil partial region 502.

FIG. 24E is an illustration of point image intensity distributions $2423a$ and $2423b$ at the front focus position 2403. Reference symbol $2423a$ represents the point image intensity distribution of the light fluxes passing through the first pupil partial region 501, and reference symbol $2423b$ represents the point image intensity distribution of the light fluxes passing through the second pupil partial region 502.

FIG. 24H is an illustration of the point image intensity distributions $2424a$ and $2424b$ at the rear focus position 2404. Reference symbol $2424a$ represents the point image intensity distribution of the light fluxes passing through the first pupil partial region 501, and reference symbol $2424b$ represents the point image intensity distribution of the light fluxes passing through the second pupil partial region 502.

FIG. 24I is an illustration of the point image intensity distributions $2425a$ and $2425b$ at the best image plane position 2405. Reference symbol $2425a$ represents the point image intensity distribution of the light fluxes passing through the first pupil partial region 501, and reference symbol $2425b$ represents the point image intensity distribution of the light fluxes passing through the second pupil partial region 502.

FIG. 24J is an illustration of the point image intensity distributions 2426a and 2426b at the front focus position 2406. Reference symbol 2426a represents the point image intensity distribution of the light fluxes passing through the first pupil partial region 501, and reference symbol 2426b represents the point image intensity distribution of the light fluxes passing through the second pupil partial region 502.

When the lens aberration is absent, as is understood through comparison between FIG. 24C and FIG. 24E, the point image intensity distribution 2421a at the rear focus position 2401 and the point image intensity distribution 2423a at the front focus position 2403 are line symmetric with respect to the vertical axis. Further, the point image intensity distribution 2421b at the rear focus position 2401 and the point image intensity distribution 2423b at the front focus position 2403 are line symmetric with respect to the vertical axis. Further, as illustrated in FIG. 24D, the point image intensity distribution 2422a at the best image plane position 2402 and the point image intensity distribution 2422b at the best image plane position match with each other. As illustrated in FIG. 24B, the defocus offset is not generated between the true defocus position and the focus detection defocus position calculated based on the point image intensity distributions 2421a, 2421b, 2422a, 2422b, 2423a, and 2423b.

When the lens aberration is present, as is understood through comparison between FIG. 24H and FIG. 24J, the point image intensity distribution 2424a at the rear focus position 2404 and the point image intensity distribution 2426a at the front focus position 2406 are not line symmetric with respect to the vertical axis. Further, the point image intensity distribution 2424b at the rear focus position 2404 and the point image intensity distribution 2426b at the front focus position 2406 are not line symmetric with respect to the vertical axis. Further, as is understood from FIG. 24I, the point image intensity distribution 2425a at the best image plane position 2405 and the point image intensity distribution 2425b at the best image plane position 2405 do not match with each other. Further, as illustrated in FIG. 24G, a defocus offset dz is generated between the true defocus position and the focus detection defocus position calculated based on the point image intensity distributions.

Note that, in this embodiment, a case where the point image intensity distributions are used for the defocus amount correction is described as an example, but the point image intensity distributions can be used for image processing and the like.

As described above, according to this embodiment, based on the lens light field data and the sensor light-receiving intensity characteristic, the point image intensity distributions of a plurality of sensor positions in the optical axis direction are generated. Then, based on the point unction image intensity distribution of the light fluxes passing through the pupil region 500 that is the entire region of the exit pupil of the photographing lens 105, the best image plane position (first in-focus position) is calculated. Further, based on the point image intensity distribution of the light fluxes passing through the first pupil partial region 501 and the point image intensity distribution of the light fluxes passing through the second pupil partial region 502, the focus detection defocus position (second in-focus position) is calculated. Then, based on the difference between the first in-focus position and the second in-focus position, the correction value is calculated, to thereby correct the defocus amount obtained through the phase-difference focus detection by this correction value. Then, based on the defocus amount corrected by this correction value, the photographing lens 105 is driven for focusing. The point image intensity distribution is obtained based on the lens light field data specific to the photographing lens 105 and the sensor light-receiving intensity characteristic specific to the image pickup apparatus main body 120. Therefore, the correction value obtained based on the point image intensity distribution is a correction value taking into consideration of the manufacturing variations of the photographing lens 105 and the image pickup apparatus main body 120. Therefore, according to this embodiment, an image pickup apparatus capable of performing auto-focus at high accuracy can be provided. Further, by holding the acquired correction value, the defocus amount can be rapidly corrected with use of the correction value, which enables further rapid auto-focus at high accuracy.

Second Embodiment

Figure 25:
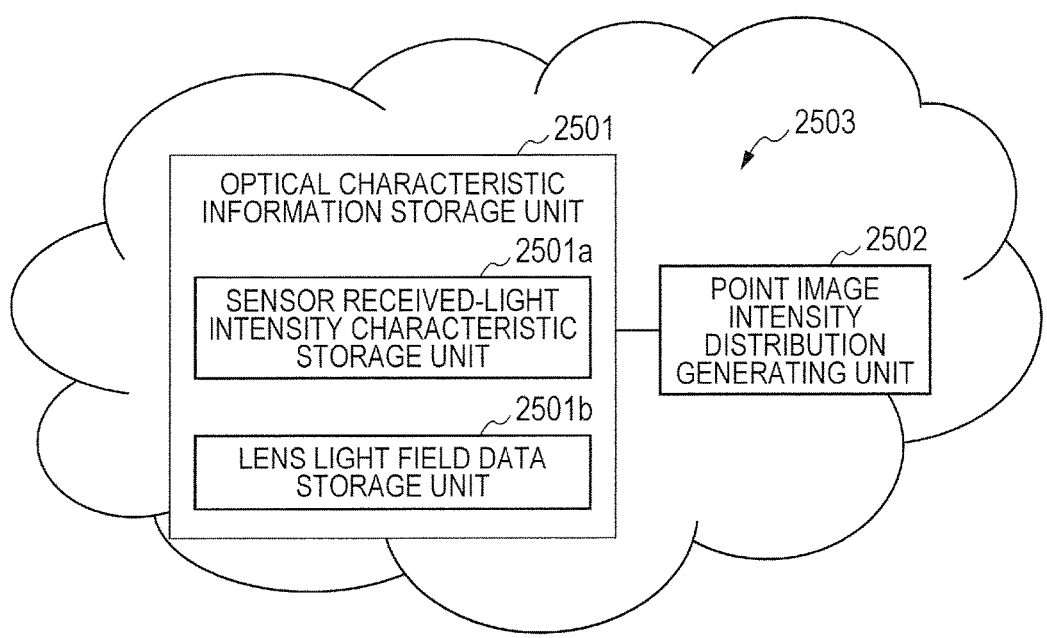
FIG. 25 is a schematic diagram for illustrating a configuration of an image pickup system according to a second embodiment of the present invention.

Next, an image pickup system according to a second embodiment of the present invention is described with reference to the drawings. FIG. 25 is a schematic diagram for illustrating the configuration of the image pickup system according to this embodiment. The same components as the image pickup apparatus according to the first embodiment illustrated in FIG. 1 to FIG. 24J are denoted by the same reference symbols, and the description thereof is omitted or simplified herein.

The image pickup system according to this embodiment is configured to hold the sensor light-receiving intensity characteristic and the lens light field data on the network, and generate the point image intensity distribution by the point image intensity distribution generating unit on the network.

As illustrated in FIG. 25, a processor 2503 including an optical characteristic information storage unit (optical characteristic information storage device, optical characteristic information storage portion) 2501 and a point image intensity distribution generating unit (point image intensity distribution generating portion) 2502 is provided on the network. The optical characteristic information storage unit 2501 includes a sensor light-receiving intensity characteristic storage unit (sensor light-receiving intensity characteristic storage portion) 2501a and a lens light field data storage unit (lens light field data storage portion) 2501b. The optical characteristic information storage unit 2501 and the point image intensity distribution generating unit 2502 are connected to each other. The sensor light-receiving intensity characteristic is stored in the sensor light-receiving intensity characteristic storage unit 2501a. The lens light field data is stored in the lens light field data storage unit 2501b.

The image pickup apparatus 10 may access the processor 2503 on the network through communication.

In this manner, the image pickup system according to this embodiment is formed.

According to this embodiment, the sensor light-receiving intensity characteristic and the lens light field data, which have a large amount of information, are held on the network, and hence the data amount to be held by the image pickup apparatus 10 and the photographing lens 105 can be reduced.

Note that, the configuration of the image pickup apparatus 10, the focus detection processing, the point image intensity distribution generation processing, and the defocus amount correction processing according to this embodiment are similar to those in the above-mentioned first embodiment, and hence the description thereof is omitted herein. Note that, in order to enable the image pickup apparatus 10 to access the optical characteristic information storage unit 2501 and the point image intensity distribution generating unit 2502 on the network, the image pickup apparatus 10 is preferred to include a communication function (communication portion) (not shown). Such a communication function (communication portion) may be a wireless communication function (wireless communication portion) or a wired communication function (wired communication portion).

Next, the operation of the image pickup system according to this embodiment is described with reference to FIG. 26. FIG. 26 is a flow chart for illustrating the schematic operation of the image pickup system according to this embodiment.

First, sensor information and lens information are acquired (Step S2601). Specifically, lens information (lens ID) is acquired from the lens unit 100, and sensor information (sensor ID) is acquired from the image pickup apparatus main body 120. The lens ID refers to an ID given to the photographing lens 105, and the sensor ID refers to an ID given to the image pickup element 122 incorporated in the image pickup apparatus main body 120. Such sensor information and lens information are transmitted from the image pickup apparatus 10 to the processor 2503 on the network. In this manner, the processor 2503 acquires the sensor information and the lens information.

Next, the processor 2503 acquires a sensor light-receiving intensity characteristic (Step S2602). The sensor light-receiving intensity characteristic corresponding to each sensor ID is stored in advance in the sensor light-receiving intensity characteristic storage unit 2501a. Based on the sensor information (sensor ID) acquired in Step S2601, the sensor light-receiving intensity characteristic specific to the image pickup element 122 is acquired from the sensor light-receiving intensity characteristic storage unit 2501a.

Next, the processor 2503 acquires lens light field data (Step S2603). The lens light field data corresponding to each lens ID is stored in advance in the lens light field data storage unit 2501b. Based on the lens information (lens ID) acquired in Step S2601, the lens light field data specific to the photographing lens 105 is acquired from the lens light field data storage unit 2501b.

Next, the processor 2503 performs the point image intensity distribution generation processing (Step S2604). Specifically, based on the sensor light-receiving intensity characteristic acquired in Step S2602 and the lens light field data acquired in Step S2603, the point image intensity distribution is generated by the point image intensity distribution generating unit 2502.

Next, the correction value is calculated (Step S2605). Specifically, the correction value is calculated based on the point image intensity distribution generated in Step S2604. The calculation of the correction value is similar to the calculation of the correction value of the first embodiment, and hence the description thereof is omitted herein. The correction value is calculated in, for example, the image pickup apparatus 10. Note that, the correction value may be calculated on the processor 2503 side.

Next, the calculated correction value is recorded (Step S2606). Specifically, the correction value calculated in Step S2605 is recorded in the lens memory 118 or the EEPROM 125c of the image pickup apparatus 10.

This correction value may be calculated and recorded in advance for all combinations obtained by changing parameters such as the image height, the aperture value, the lens zoom state, and the lens focus state, or may be calculated and recorded through communication each time as necessary.

Further, in this embodiment, a case where the correction value is calculated based on the point image intensity distribution so as to record the correction value is described as an example, but the point image intensity distribution may be recorded and used for image processing or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-266496, filed Dec. 26, 2014 which is hereby incorporated by reference wherein in its entirety.

What is claimed is:

1. An image pickup apparatus, comprising:
   a processor; and
   a memory including instructions that, when executed by the processor, cause the processor to:
   calculate a point image intensity distribution, which represents a light intensity distribution when light from a point light source is received on a light receiving surface of an image pickup element, based on lens light field data and a sensor light-receiving intensity characteristic,
   wherein the lens light field data includes:
      information relating to directions of a plurality of light fluxes emitted from one point of an object position and passing through different regions of an exit pupil of an imaging optical system, and
      information relating to positions of points on the plurality of light fluxes, and
   wherein the sensor light-receiving intensity characteristic represents light-receiving intensities, which are determined on a light receiving surface of the image pickup element, of light fluxes passing through respective regions of an entrance pupil of the image pickup element arranged over the image pickup element, and the light fluxes passing through respective regions of the entrance pupil of the image pickup element are respectively received by divided pixels of the image pickup element.

2. An image pickup apparatus according to claim 1, wherein the lens light field data further comprises information relating to intensities of the plurality of light fluxes.

3. An image pickup apparatus according to claim 1, wherein the plurality of light fluxes in the lens light field data are free from intersecting at one point at an imaging position on the image pickup element.

4. An image pickup apparatus according to claim 1, wherein, in the lens light field data, coordinates of the positions of the points on the plurality of light fluxes are determined on a plane perpendicularly intersecting with an optical axis of the imaging optical system.

5. An image pickup apparatus according to claim 1, wherein a part of the lens light field data is selectively used based on vignetting information of the imaging optical system.

6. An image pickup apparatus according to claim 2, wherein the point image intensity distribution is generated by:
calculating sensor light-receiving light field data based on a product of the intensities of the plurality of light fluxes in the lens light field data and the sensor light-receiving intensity characteristic in a region to which the plurality of light fluxes reach; and
integrating light-receiving intensities of the light fluxes in the sensor light-receiving light field data based on reaching points on the image pickup element of the light fluxes in the sensor light-receiving light field data at intervals of pixels arranged in the image pickup element.

7. An image pickup apparatus according to claim 1, wherein the instructions, when executed by the processor, further cause the processor to:
detect an in-focus position, and
calculate a correction value based on the point image intensity distribution of each of a plurality of positions on an optical axis,
wherein the in-focus position is corrected with use of the correction value.

8. An image pickup apparatus according to claim 7, wherein the image pickup apparatus is configured to:
calculate a first in-focus position based on a first point image intensity distribution that is the point image intensity distribution of the light fluxes passing through a first pupil partial region serving as a part of the exit pupil of the imaging optical system, and based on a second point image intensity distribution that is the point image intensity distribution of the light fluxes passing through a second pupil partial region serving as another part of the exit pupil of the imaging optical system different from the first pupil partial region;
calculate a second in-focus position based on a point image intensity distribution of the light fluxes passing through a pupil region that is an entire region of the exit pupil of the imaging optical system; and
calculate the correction value based on a difference between the first in-focus position and the second in-focus position.

9. An image pickup system, comprising:
a first memory which stores lens light field data including information relating to directions of a plurality of light fluxes emitted from one point of an object position and passing through different regions of an exit pupil of an imaging optical system, and information relating to positions of points on the plurality of light fluxes;
a second memory which stores a sensor light-receiving intensity characteristic representing light-receiving intensities, which are determined on a light receiving surface of an image pickup element, of light fluxes passing through respective regions of an entrance pupil of the image pickup element arranged over the image pickup element, and the light fluxes passing through respective regions of the entrance pupil of the the image pickpu element are respectively received by divided pixels of the image pickup element; and
a processor,
wherein the second memory includes instructions that, when executed by the processor, cause the processor to:
calculate a point image intensity distribution, which represents a light intensity distribution when light from a point light source is received on the light receiving surface of the image pickup element, based on the lens light field data and the sensor light-receiving intensity characteristic.

10. An image pickup apparatus, comprising:
an image pickup element that has a plurality of pixels each of which includes divided pixels, wherein the divided pixels respectively receive light fluxes passing through different regions of an exit pupil of an imaging optical system;
a processor; and
a memory including instructions that, when executed by the processor, cause the processor to:
calculate a point image intensity distribution, which represents a light intensity distribution when light from a point light source is received on a light receiving surface of the image pickup element, based on lens light field data and a sensor light-receiving intensity characteristic,
wherein the lens light field data includes:
information relating to directions of a plurality of light fluxes emitted from one point of an object position and passing through different regions of the exit pupil of the imaging optical system, and
information relating to positions of points on the plurality of light fluxes, and
wherein the sensor light-receiving intensity characteristic represents light-receiving intensities, which are determined on a light receiving surface of the image pickup element, of light fluxes passing through respective regions of an entrance pupil of the image pickup element arranged over the image pickup element.

11. A control method of an image pickup apparatus comprising:
calculating a point image intensity distribution, which represents a light intensity distribution when light from a point light source is received on a light receiving surface of an image pickup element, based on lens light field data and a sensor light-receiving intensity characteristic,
wherein the lens light field data includes:
information relating to directions of a plurality of light fluxes emitted from one point of an object position and passing through different regions of an exit pupil of an imaging optical system, and
information relating to positions of points on the plurality of light fluxes, and
wherein the sensor light-receiving intensity characteristic represents light receiving intensities, which are determined on a light receiving surface of the image pickup element, of light fluxes passing through respective regions of an entrance pupil of the image pickup element arranged over the image pickup element and respectively received by divided pixels of the image pickup element.

12. The control method of the image pickup apparatus according to claim 11, further comprising:
detecting an in-focus position; and
calculating a correction value based on the point image intensity distribution of each of a plurality of positions on an optical axis,
wherein the in-focus position is corrected with use of the correction value.

13. A control method of an image pickup apparatus including an image pickup element that has a plurality of pixels each of which includes divided pixels, wherein the divided pixels respectively receive light fluxes passing through different regions of an exit pupil of an imaging optical system, the control method comprising:
calculating a point image intensity distribution, which represents a light intensity distribution when light from a point light source is received on a light receiving surface of the image pickup element, based on lens light field data and a sensor light-receiving intensity characteristic,
wherein the lens light field data includes:
information relating to directions of a plurality of light fluxes emitted from one point of an object position and passing through different regions of an exit pupil of an imaging optical system, and
information relating to positions of points on the plurality of light fluxes, and
wherein the sensor light-receiving intensity characteristic represents light receiving intensities, which are determined on a light receiving surface of the image pickup element, of light fluxes passing through respective regions of an entrance pupil of the image pickup element arranged over the image pickup element.

14. The control method of the image pickup apparatus according to claim 13, further comprising:
detecting an in-focus position, and
calculating a correction value based on the point image intensity distribution of each of a plurality of positions on an optical axis,
wherein the in-focus position is corrected with use of the correction value.

15. An information processing apparatus, comprising:
a processor; and
a memory including instructions that, when executed by the processor, cause the processor to:
read out a point image intensity distribution from the memory, which represents a light intensity distribution when light from a point light source is received on a light receiving surface of an image pickup element, and which is previously calculated based on lens aberration data and a sensor light-receiving intensity characteristic, and
wherein the sensor light-receiving intensity characteristic represents light-receiving intensities, which are determined on a light receiving surface of the image pickup element, of light fluxes passing through respective regions of an entrance pupil of the image pickup element arranged over the image pickup element, and the light fluxes passing through respective regions of the entrance pupil of the image pickup element are respectively received by divided pixels of the image pickup element.

16. An information processing apparatus according to claim 15, wherein the instructions, when executed by the processor, further cause the processor to:
calculate the point image intensity distribution based on lens aberration data and a sensor light-receiving intensity characteristic.

17. An information processing apparatus according to claim 15, wherein the instructions, when executed by the processor, further cause the processor to:
calculate a correction value for correcting a detected in-focus position based on the point image intensity distribution of each of a plurality of positions on an optical axis.

18. An information processing apparatus according to claim 15, wherein the instructions, when executed by the processor, further cause the processor to:
calculate a correction value for correcting an aberration based on the point image intensity distribution of each of a plurality of positions on an optical axis.

19. An information processing apparatus according to claim 15, wherein the instructions, when executed by the processor, further cause the processor to:
detect an in-focus position,
calculate a correction value based on the point image intensity distribution of each of a plurality of positions on an optical axis, and
correct the in-focus position with use of the correction value.

20. An information processing apparatus according to claim 15, wherein the instructions, when executed by the processor, further cause the processor to:
calculate a first in-focus position based on a first point image intensity distribution that is the point image intensity distribution of the light fluxes passing through a first pupil partial region serving as a part of an exit pupil of the imaging optical system, and based on a second point image intensity distribution that is the point image intensity distribution of the light fluxes passing through a second pupil partial region serving as another part of the exit pupil of the imaging optical system different from the first pupil partial region;
calculate a second in-focus position based on a point image intensity distribution of the light fluxes passing through a pupil region that is an entire region of the exit pupil of the imaging optical system; and
calculate a correction value based on a difference between the first in-focus position and the second in-focus position.

21. An information processing system, comprising:
a first memory which stores lens aberration data;
a second memory which stores a sensor light-receiving intensity characteristic representing light-receiving intensities, which are determined on a light receiving surface of an image pickup element, of light fluxes passing through respective regions of an entrance pupil of the image pickup element arranged over the image pickup element, and the light fluxes passing through respective regions of the entrance pupil of the image pickup element are respectively received by divided pixels of the image pickup element; and
a processor,
wherein the second memory includes instructions that, when executed by the processor, cause the processor to:

calculate a point image intensity distribution, which represents a light intensity distribution when light from a point light source is received on the light receiving surface of the image pickup element, based on the lens aberration data and the sensor light-receiving intensity characteristic.

22. An image pickup apparatus, comprising:
an image pickup element that has a plurality of pixels each of which includes divided pixels, wherein the divided pixels respectively receive light fluxes passing through different regions of an exit pupil of an imaging optical system;
a processor; and
a memory including instructions that, when executed by the processor, cause the processor to:
calculate a point image intensity distribution, which represents a light intensity distribution when light from a point light source is received on a light receiving surface of the image pickup element, based on lens aberration data and a sensor light-receiving intensity characteristic,
detect an in-focus position,
calculate a correction value based on the point image intensity distribution of each of a plurality of positions on an optical axis, and
correct the in-focus position with use of the correction value, and
wherein the sensor light-receiving intensity characteristic represents light-receiving intensities, which are determined on a light receiving surface of the image pickup element, of light fluxes passing through respective regions of an entrance pupil of the image pickup element arranged over the image pickup element.

23. An information processing method, comprising:
reading out a point image intensity distribution, which represents a light intensity distribution when light from a point light source is received on a light receiving surface of an image pickup element, and which is previously calculated based on lens aberration data and a sensor light-receiving intensity characteristic,
wherein the sensor light-receiving intensity characteristic represents light-receiving intensities, which are determined on a light receiving surface of the image pickup element, of light fluxes passing through respective regions of an entrance pupil of the image pickup element arranged over the image pickup element, and the light fluxes passing through respective regions of the entrance pupil of the image pickup element are respectively received by divided pixels of the image pickup element.

24. An information processing method, comprising:
storing lens aberration data in a first memory;
storing a sensor light-receiving intensity characteristic in a second memory, the sensor light-receiving intensity characteristic representing light-receiving intensities, which are determined on a light receiving surface of an image pickup element, of light fluxes passing through respective regions of an entrance pupil of the image pickup element arranged over the image pickup element, and the light fluxes passing through respective regions of the entrance pupil of the image pickup element are respectively received by divided pixels of the image pickup element; and
calculating a point image intensity distribution, which represents a light intensity distribution when light from a point light source is received on the light receiving surface of the image pickup element, based on the lens aberration data and the sensor light-receiving intensity characteristic.

25. An image pickup method, wherein
an image pickup element that has a plurality of pixels each of which includes divided pixels, wherein the divided pixels respectively receive light fluxes passing through different regions of an exit pupil of an imaging optical system, wherein the method comprises:
calculating a point image intensity distribution, which represents a light intensity distribution when light from a point light source is received on a light receiving surface of the image pickup element, based on lens aberration data and a sensor light-receiving intensity characteristic;
detecting an in-focus position;
calculating a correction value based on the point image intensity distribution of each of a plurality of positions on an optical axis; and
correcting the in-focus position with use of the correction value, and
wherein the sensor light-receiving intensity characteristic represents light-receiving intensities, which are determined on a light receiving surface of the image pickup element, of light fluxes passing through respective regions of an entrance pupil of the image pickup element arranged over the image pickup element.

* * * * *